United States Patent
Ebisawa

(10) Patent No.: US 12,312,489 B2
(45) Date of Patent: May 27, 2025

(54) CURABLE COMPOSITION, CURED PRODUCT AND METHOD FOR FORMING INSULATING FILM

(71) Applicant: TOKYO OHKA KOGYO CO., LTD., Kawasaki (JP)

(72) Inventor: Kazuaki Ebisawa, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 556 days.

(21) Appl. No.: 17/632,396

(22) PCT Filed: Jul. 6, 2020

(86) PCT No.: PCT/JP2020/026476
§ 371 (c)(1),
(2) Date: Feb. 2, 2022

(87) PCT Pub. No.: WO2021/033441
PCT Pub. Date: Feb. 25, 2021

(65) Prior Publication Data
US 2022/0289889 A1    Sep. 15, 2022

(30) Foreign Application Priority Data
Aug. 20, 2019  (JP) ................... 2019-150663

(51) Int. Cl.
| | | |
|---|---|---|
| C08F 2/46 | (2006.01) | |
| C08F 2/50 | (2006.01) | |
| C08F 8/16 | (2006.01) | |
| C08F 8/46 | (2006.01) | |
| C08G 61/04 | (2006.01) | |
| C09D 171/12 | (2006.01) | |

(52) U.S. Cl.
CPC .............. *C09D 171/12* (2013.01); *C08F 8/16* (2013.01); *C08F 8/46* (2013.01)

(58) Field of Classification Search
CPC ...... C08F 8/00; C08F 8/46; C08F 8/16; C08F 212/08; C09D 171/12; C09D 125/08; C08G 75/045; C08K 5/37

USPC ........... 522/39, 33, 6, 189, 184, 71, 1; 520/1
See application file for complete search history.

(56) References Cited

U.S. PATENT DOCUMENTS

| | | | | |
|---|---|---|---|---|
| 4,634,644 | A | * | 1/1987 | Irving .................... G03F 7/168 430/327 |
| 2004/0039127 | A1 | | 2/2004 | Amou et al. |
| 2014/0107278 | A1 | | 4/2014 | Ozaki et al. |
| 2020/0285151 | A1 | * | 9/2020 | Kandanarachchi ..... G03F 7/031 |

FOREIGN PATENT DOCUMENTS

| | | | | |
|---|---|---|---|---|
| CN | 101859067 | A | | 10/2010 |
| DE | 3540119 | | * | 5/1987 |
| DE | 3540119 | A | * | 5/1987 ............ C08F 283/08 |
| JP | S60-243125 | A | | 12/1985 |
| JP | 2004-087639 | A | | 3/2004 |
| JP | 2015-069141 | A | | 4/2015 |
| JP | 2016-074902 | A | | 5/2016 |
| JP | 2018-159022 | A | | 10/2018 |
| JP | 2020-084057 | A | | 6/2020 |
| WO | WO 2012/173088 | A1 | | 12/2012 |
| WO | WO 2014/125884 | A1 | | 8/2014 |
| WO | WO 2017/126536 | A1 | | 7/2017 |

OTHER PUBLICATIONS

Schlemmer et al, DE 3540119 Machine Translation, May 14, 1987 (Year: 1987).*

* cited by examiner

*Primary Examiner* — Jessica Whiteley
(74) *Attorney, Agent, or Firm* — KNOBBE, MARTENS, OLSON & BEAR, LLP

(57) ABSTRACT

A curable composition which enables the formation of a cured product having a low dielectric constant, low dielectric loss tangent, high heat resistance, good elongation and excellent tensile strength and which has excellent film forming properties; a cured product of the curable composition; and a method for forming an insulating film using the curable composition. This curable composition contains a modified maleimide compound, a radical generator and a thiol compound. The curable composition may contain a photo-radical generator as the radical generator. The curable composition may contain a protonic acid.

11 Claims, No Drawings

CURABLE COMPOSITION, CURED PRODUCT AND METHOD FOR FORMING INSULATING FILM

CROSS-REFERENCE TO RELATED APPLICATIONS

This application is the U.S. National Phase under 35 U.S.C. § 371 of International Application PCT/JP2020/026476, filed Jul. 6, 2020, designating the U.S., and published in Japanese as WO 2021/033441 on Feb. 25, 2021 which claims priority to Japanese Patent Application No. 2019-150663, filed Aug. 20, 2019, the entire contents of which are incorporated herein by reference.

TECHNICAL FIELD

The present invention relates to a curable composition, a cured product, and a method for forming an insulating film.

BACKGROUND ART

In recent years, higher frequencies have been increasingly used in communication equipment such as mobile phones. Consequently, an insulating film that insulates metal wiring in the communication equipment is required to respond to higher frequencies.

Here, a transmission loss increases as a frequency increase, and an electrical signal attenuates as a transmission loss increases. Thus, reduction in transmission loss is required to respond to higher frequencies.

To reduce transmission loss, a technique of forming an insulating film using a material having a low dielectric constant and a low dielectric loss tangent is disclosed (e.g., Patent Literature 1).
Patent Document 1: Japanese Unexamined Patent Application, Publication No. 2004-87639

DISCLOSURE OF THE INVENTION

Problems to be Solved by the Invention

However, the technique of Patent Literature 1 is a technique using a resin composition having a specific structure, and specifically, it is a technique using a resin composition containing a cross-linking component represented by the formula (1) described in Patent Literature 1. Thus, a technique using other compositions other than the composition described in Patent Literature 1 is required.

The response to higher frequencies has also been required in network related electronic equipment such as servers, electronic equipment such as computers, and electrical and electronic devices other than the communication equipment.

In the production of electrical and electronic devices, an insulating film is formed from the composition, and then members such as wiring are further formed by heating, in many cases. Accordingly, heat resistance is also required for the insulating film.

When an insulating film is formed from a composition, the insulating film can be easily formed by a coating method. Accordingly, it is desired that the composition be applicable to coating, that is, the composition has excellent film formation properties by coating.

Further, there have increasingly been cases where durability against deformation such as elongation is required for an insulating film, as typified by panel for flexible display devices applications. Thus, the composition that may form an insulating film is required to be capable of forming a film having excellent elongation and tensile strength.

The present invention has been made in view of the above problems and an object thereof is to provide a curable composition capable of forming a cured product having a low dielectric constant and a low dielectric loss tangent as well as excellent heat resistance, elongation, and tensile strength, and having excellent film formation properties, a cured product of the curable composition, and a method for forming an insulating film using the curable composition.

Means for Solving the Problems

The present inventors have found that a curable composition including a radical generator (C) and a thiol compound (D) together with a modified maleimide compound (A) having a radically polymerizable group having a specific structure including a maleimide skeleton yields a cured product having a low dielectric constant and a low dielectric loss tangent as well as excellent heat resistance, elongation, and tensile strength, and has excellent film formation properties, thereby completing the present invention.

The first aspect of the present invention is a curable composition including a modified maleimide compound (A), a radical generator (C), and a thiol compound (D), the modified maleimide compound (A) having one or more groups represented by the following formula (a1):

[Chem. 1]

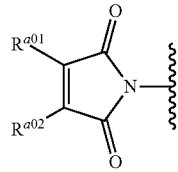

(a1)

and,
the group represented by the formula (a1) being bonded to a carbon atom in an aliphatic hydrocarbon group or an aromatic group in the modified maleimide compound (A), wherein $R^{a01}$ and $R^{a02}$ are each independently a hydrogen atom, an alkyl group having 1 or more and 6 or less carbon atoms, a cycloalkyl group having 3 or more and 8 or less carbon atoms, or an aryl group having 6 or more and 12 or less carbon atoms.

The second aspect of the present invention is a cured product of the curable composition according to the first aspect.

The third aspect of the present invention is a method for forming an insulating film including:
coating the curable composition according to the first aspect on an insulating film formation place; and
curing the coating film.

Effects of the Invention

The present invention can provide a curable composition capable of forming a cured product having a low dielectric constant and a low dielectric loss tangent as well as excellent heat resistance, elongation, and tensile strength, and having excellent film formation properties, a cured product of the curable composition, and a method for forming an insulating film using the curable composition.

PREFERRED MODE FOR CARRYING OUT THE INVENTION

<Curable Composition>

The curable composition includes a modified maleimide compound (A), a radical generator (C), and a thiol compound (D).

The modified maleimide compound (A) has one or more groups represented by the following formula (a1):

[Chem. 2]

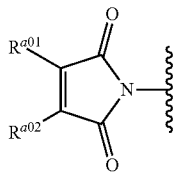

(a1)

The group represented by the formula (a1) is bonded to a carbon atom in an aliphatic hydrocarbon group or an aromatic group in the modified maleimide compound (A).

In the formula (a1), $R^{a01}$ and $R^{a02}$ are each independently a hydrogen atom, an alkyl group having 1 or more and 6 or less carbon atoms, a cycloalkyl group having 3 or more and 8 or less carbon atoms, or an aryl group having 6 or more 12 or less carbon atoms.

The above curable composition including the modified maleimide compound (A) and the radical generator (C) has good film formation properties, and yields a cured product having a low dielectric constant and a low dielectric loss tangent as well as excellent heat resistance.

Since the curable composition includes the thiol compound (D) together with the modified maleimide compound (A), a cured product having excellent elongation and tensile strength can be formed using the curable composition.

The curable composition is preferably used to form an insulating film. Typically, the curable composition is used in electrical and electronic devices having metal wiring to form an insulating film that insulates metal wiring.

The electrical and electronic devices are not particularly limited, and examples thereof include communication equipment such as mobile phones, network related electronic equipment such as servers, electronic equipment such as computers, in particular, semiconductor components included in the equipment, and specifically, a semiconductor package referred to as a wafer level package.

These electrical and electronic devices have metal wiring made of a metal such as copper and an alloy on a substrate for electrical and electronic devices. Examples of the substrate for electrical and electronic devices having metal wiring include a silicon substrate and a substrate having various layers and members on a silicon substrate.

This metal wiring and another metal wiring or conductive member are insulated by an insulating film formed from the curable composition.

By using the curable composition including the components described below, an insulating film having a low dielectric constant and a low dielectric loss tangent (tan δ) can be formed. Thus, the curable composition including the components described below is suitable as the insulating film that insulates metal wiring of electrical and electronic devices using high frequency signals. Note that as used herein, the "high frequency" means a frequency of 3 GHz or more.

Since an insulating film having excellent heat resistance can be formed, for example, the curable composition can be used to form an insulating film in electrical and electronic devices in which an insulating film is formed from a curable composition and then other members are formed by heating.

Further, the curable composition yields a cured product having excellent elongation and tensile strength. Thus, the insulating film formed by using the curable composition can be suitably used in, for example, applications that are subjected to bending stress and tensile stress, such as a panel for flexible display devices.

The curable composition has excellent film formation properties by coating, that is, when a film is formed by coating, no crack and no crystal are generated, no tackiness (stickiness) is present, and the compatibility of the components is good, and thus an insulating film can be formed by coating which is an easy method.

Hereinafter, essential or optional components included in the curable composition will be described.

<Modified Maleimide Compound (A)>

The curable composition contains the modified maleimide compound (A) having one or more groups represented by the following formula (a1) in one molecule. The group represented by the following formula (a1) is bonded to a carbon atom in an aliphatic hydrocarbon group or an aromatic group included in the modified maleimide compound (A). The modified maleimide compound (A) may be a maleimide modified resin (A1) which is a polymer having one or more groups represented by the following formula (a1) in one molecule, or may be a maleimide monomer (A2) which is a non-polymer having one or more groups represented by the following formula (a1) in one molecule. The modified maleimide compound (A) preferably consists only of the maleimide modified resin (A1) or is preferably a combination of the maleimide modified resin (A1) and a maleimide modified monomer (A2), from the viewpoint of easy formation of a cured product having excellent mechanical properties, heat resistance, and chemical resistance.

[Chem. 3]

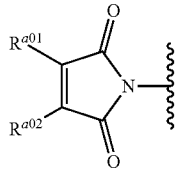

(a1)

wherein $R^{a01}$ and $R^{a02}$ are each independently a hydrogen atom, an alkyl group having 1 or more and 6 or less carbon atoms, a cycloalkyl group having 3 or more and 8 or less carbon atoms, or an aryl group having 6 or more and 12 or less carbon atoms.

The alkyl group having 1 or more and 6 or less carbon atoms as $R^{a01}$ and $R^{a02}$ in the formula (a1) may be a linear alkyl group or a branched alkyl group. Specific examples thereof include a methyl group, an ethyl group, a n-propyl group, a n-butyl group, a n-pentyl group, a n-hexyl group, an isopropyl group, an isobutyl group, a sec-butyl group, a tert-butyl group, an isopentyl group, a neopentyl group, a tert-pentyl group, and an isohexyl group.

Specific examples of the cycloalkyl group having 3 or more and 8 or less carbon atoms as $R^{a01}$ and $R^{a02}$ in the formula (a1) include a cyclopropyl group, a cyclobutyl group, a cyclopentyl group, and a cyclohexyl group.

Specific examples of the aryl group having 6 or more and 12 or less carbon atoms as $R^{a01}$ and $R^{a02}$ in the formula (a1) include a phenyl group, a biphenyl group, a 1-naphthyl group, and a 2-naphthyl group.

Both $R^{a01}$ and $R^{a02}$ in the formula (a1) are preferably a hydrogen atom. When both $R^{a01}$ and $R^{a02}$ are a hydrogen atom, the modified maleimide compound (A) has excellent polymerization properties. Thus, a curable composition having excellent curing properties is easily obtained. When both $R^{a01}$ and $R^{a02}$ are a hydrogen atom, the group represented by the formula (a1) is an unsubstituted maleimide group.

The binding portion of the group represented by the formula (a1) in the modified maleimide compound (A) is not particularly limited within a range not inhibiting the purpose of the present invention. When the modified maleimide compound (A) is the maleimide modified resin (A1), the group represented by the above formula (a1) is, in the maleimide modified resin (A1), preferably bonded to a carbon atom in an aliphatic hydrocarbon group or an aromatic group in the main chain and/or a side chain of the maleimide modified resin (A1), the carbon atom being positioned in other than the main chain terminal of the maleimide modified resin (A1). That is, the maleimide modified resin (A1) preferably has a structure in which a hydrogen atom that is bonded to a carbon atom in an aliphatic hydrocarbon group or an aromatic group in the main chain and/or a side chain of the resin, the carbon atom being positioned in other than the main chain terminal of the maleimide modified resin (A1) is substituted with the group represented by the formula (a1).

Examples of the resin that yields the maleimide modified resin (A1) having such a structure include a polymer of a monomer having an unsaturated double bond. Examples of such resin include a (meth)acrylic resin and a polystyrene resin. Note that as used herein, "(meth)acrylic" means both "acrylic" and "methacrylic".

The "(meth)acrylic resin" is the resin that includes a constitutional unit derived from one or more monomers selected from the group consisting of (meth)acrylic acid, (meth)acrylic acid ester, and (meth)acrylamide that may be an N-substituted product. The (meth)acrylic resin may include a constitutional unit derived from a monomer other than the (meth)acrylic acid, (meth)acrylic acid ester, and (meth)acrylamide that may be an N-substituted product.

The "polystyrene resin" is the resin that includes a constitutional unit derived from styrene and/or a styrene derivative.

In the specification of the present application, the resin that includes a constitutional unit derived from one or more monomers selected from the group consisting of (meth)acrylic acid, (meth)acrylic acid ester, and (meth)acrylamide that may be an N-substituted product, as well as a constitutional unit derived from styrene and/or a styrene derivative is handled as the (meth)acrylic resin, for convenience.

Note that as used herein, the "side chain" means a molecular chain that is branched from the main chain. For example, when the resin is the (meth)acrylic resin, a carboxy group, an ester group, an amide group that may be N-substituted, and a methyl group which are bonded to the a carbon of a monomer of the (meth)acrylic resin are the side chains. When the resin is a styrene resin, a phenyl group that is bonded to a carbon atom derived from a carbon-carbon double bond of a monomer of the styrene resin and derivatives thereof are the side chains.

In the maleimide modified resin (A1), the group represented by the above formula (a1) is bonded to a carbon atom in an aliphatic hydrocarbon group or an aromatic group in the main chain and/or a side chain of the maleimide modified resin (A1), the carbon atom being positioned in other than the main chain terminal of the maleimide modified resin (A1), and thus the group represented by the above formula (a1) is at least a part of the side chain of the maleimide modified resin (A1).

For example, when the group represented by the above formula (a1) is bonded to a carbon atom in an aliphatic hydrocarbon group or an aromatic group in the main chain of the maleimide modified resin (A1), the carbon atom being positioned in other than the main chain terminal of the maleimide modified resin (A1), the maleimide modified resin (A1) has a structure of having an aliphatic hydrocarbon group or an aromatic group in the main chain, and the group represented by the formula (a1) is bonded to a carbon atom in the aliphatic hydrocarbon group or the aromatic group in this main chain. Thus, the group represented by the formula (a1) corresponds to a side chain of the maleimide modified resin (A1).

When the group represented by the above formula (a1) is bonded to a carbon atom in an aliphatic hydrocarbon group or an aromatic group in a side chain of the maleimide modified resin (A1), the maleimide modified resin (A1) has a structure of having an aliphatic hydrocarbon group or an aromatic group in a side chain, and the group represented by the formula (a1) is bonded to a carbon atom in the aliphatic hydrocarbon group or the aromatic group in this side chain. Thus, the group represented by the formula (a1) corresponds to a part of a side chain of the maleimide modified resin (A1).

In the maleimide modified resin (A1), the group represented by the above formula (a1) is only required to be bonded to a carbon atom in an aliphatic hydrocarbon group or an aromatic group in the main chain and/or a side chain of the maleimide modified resin (A1), the carbon atom being positioned in other than the main chain terminal of the maleimide modified resin (A1). Further, the group represented by the above formula (a1) may be bonded to a carbon atom positioned in the main chain terminal of the maleimide modified resin (A1).

The group represented by the formula (a1) is preferably included in the constitutional unit of the resin.

The main chain of the maleimide modified resin (A1) is, for example, preferably the main chain derived from the (meth)acrylic resin or the main chain derived from the polystyrene resin, but is not limited thereto. The (meth)acrylic resin and the polystyrene resin have a low dielectric constant and a low dielectric loss tangent. Thus, when the main chain is the main chain derived from the (meth)acrylic resin or the main chain derived from the polystyrene resin, the dielectric constant and the dielectric loss tangent of an insulating portion to be formed can be further reduced.

The molecular weight of the maleimide modified resin (A1) is not particularly limited, as long as the effect of the present invention is not impaired. The mass average molecular weight (Mw) is preferably 4,000 or more, more preferably 5,000 or more, and further preferably 10,000 or more. The molecular weight of the maleimide modified resin (A1) is preferably 100,000 or less, and more preferably 80,000 or less, as the mass average molecular weight (Mw).

As used herein, the mass average molecular weight (Mw) is a measured value in terms of polystyrene determined by gel permeation chromatography (GPC).

The method for producing the modified maleimide compound (A) is not particularly limited. Specifically, the modified maleimide compound (A) can be produced by a production method including a first step of condensing a primary amino group in a raw material compound such as resin having a primary amino group and a dicarboxylic anhydride represented by the following formula (a2):

[Chem. 4]

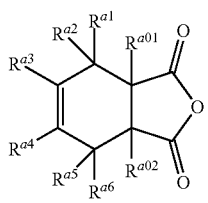

(a2)

wherein $R^{a01}$ and $R^{a02}$ are the same as $R^{a01}$ and $R^{a02}$ in the formula (a1);

$R^{a1}$ to $R^{a6}$ are each independently a hydrogen atom, a halogen atom, an alkyl group having 1 or more and 4 or less carbon atoms, or an alkoxy group having 1 or more and 4 or less carbon atoms; $R^{a1}$ and $R^{as}$ may be bonded to each other to form —O—, —S—, —CH$_2$—, or —CR$^{a7}$R$^{a8}$—; $R^{a3}$ and $R^{a4}$ may be bonded to each other to constitute a ring having 6 or more and 12 or less carbon atoms; and $R^{a7}$ and $R^{a8}$ are each independently a hydrogen atom, an alkyl group having 1 or more and 4 or less carbon atoms, or an alkoxy group having 1 or more and 4 or less carbon atoms, to generate a group represented by the following formula (a3):

[Chem. 5]

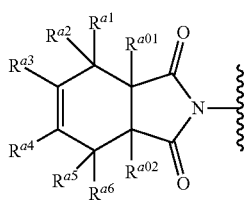

(a3)

wherein $R^{a01}$ and $R^{a02}$ are the same as $R^{a01}$ and $R^{a02}$ in the formula (a1); and $R^{a1}$ to $R^{a6}$ are the same as $R^{a1}$ to $R^{a6}$ in the formula (a2), and a second step of heating an intermediate compound having the group represented by the formula (a3) generated in the first step to convert the group represented by the formula (a3) into the group represented by the formula (a1).

Specific examples of the halogen atom as $R^{a1}$ to $R^{a6}$ in the formula (a2) include a chlorine atom, a fluorine atom, a bromine atom, and an iodine atom.

The alkyl group having 1 or more and 4 or less carbon atoms as $R^{a1}$ to $R^{a6}$ in the formula (a2) may be a linear alkyl group or a branched alkyl group. Specific examples thereof include a methyl group, an ethyl group, a n-propyl group, a n-butyl group, an isopropyl group, an isobutyl group, a sec-butyl group, and a tert-butyl group.

The alkoxy group having 1 or more and 4 or less carbon atoms as $R^{a1}$ to $R^{a6}$ in the formula (a2) may be a linear alkoxy group or a branched alkoxy group. Specific examples thereof include a methoxy group, an ethoxy group, a n-propoxy group, an isopropoxy group, and a n-butoxy group.

The alkyl group having 1 or more and 4 or less carbon atoms and the alkoxy group having 1 or more and 4 or less carbon atoms as $R^{a7}$ and $R^{a8}$ are the same as the alkyl group having 1 or more and 4 or less carbon atoms and the alkoxy group having 1 or more and 4 or less carbon atoms as $R^{a1}$ to $R^{a6}$.

In the first step, the primary amino group in the raw material compound having a primary amino group and the dicarboxylic anhydride represented by the above formula (a2) are condensed to generate a group represented by the above formula (a3). Thus, the resin having a group represented by the formula (a3) can be obtained.

Examples of the raw material compound having a primary amino group include a polymer of a monomer having an unsaturated double bond. Examples of such resin include a (meth)acrylic resin having a primary amino group and a polystyrene resin having a primary amino group. More specific examples thereof include a (meth)acrylic resin having a primary amino group at a side chain terminal and a polystyrene resin having a primary amino group at a side chain terminal.

The "(meth)acrylic resin having a primary amino group" is a (meth)acrylic resin including a constitutional unit having a primary amino group. The constitutional unit having a primary amino group may be a constitutional unit derived from (meth)acrylic acid ester, a constitutional unit derived from an N-substituted product of (meth)acrylamide, or a constitutional unit other than these constitutional units. The constitutional unit having a primary amino group is preferably a constitutional unit derived from (meth)acrylic acid ester and/or a constitutional unit derived from an N-substituted product of (meth)acrylamide.

The "polystyrene resin having a primary amino group" is a polystyrene resin including a constitutional unit having a primary amino group. The constitutional unit having a primary amino group may be a constitutional unit derived from aminostyrene such as p-aminostyrene, m-aminostyrene, and o-aminostyrene, a constitutional unit derived from a styrene derivative having an amino group such as p-aminomethylstyrene, m-aminomethylstyrene, and o-aminomethylstyrene, or a constitutional unit other than these constitutional units. The constitutional unit having a primary amino group is preferably a constitutional unit derived from aminostyrene and/or a constitutional unit derived from a styrene derivative having an amino group.

The resin having a primary amino group such as the (meth)acrylic resin having a primary amino group and the polystyrene resin having a primary amino group preferably has the primary amino group at a side chain terminal. In the (meth)acrylic resin having a primary amino group at a side chain terminal and the polystyrene resin having a primary amino group at a side chain terminal, the side chain terminal, to which the primary amino group is bonded when the side chain is a branched chain, may be any terminal of the two or more branches in the branched chain. When the structure of the terminal of the side chain is a ring structure, an arbitrary position in the ring that constitutes the ring structure is the side chain terminal to which the primary amino group is bonded.

For example, when the side chain consists of an α-naphthyl group or a β-naphthyl group, an arbitrary position on the naphthalene ring is the side chain terminal. When a group that constitutes the side chain is a branched 1-phenylethyl group, the methyl group corresponding to the terminal of two branches and an arbitrary position on the phenyl group are the side chain terminals.

In the production method of the maleimide modified resin (A1), the resin having a primary amino group (raw material compound) preferably includes a step of subjecting a monomer having a primary amino group to homopolymerization to produce a raw material compound as resin, or a step of subjecting a monomer having a primary amino group and a comonomer to copolymerization to produce a raw material compound as resin.

Examples of the monomer having a primary amino group include (meth)acrylates such as aminomethyl (meth)acrylate, 2-aminoethyl (meth)acrylate, 3-aminopropyl (meth)acrylate, 4-aminophenyl (meth)acrylate, 3-aminophenyl (meth)acrylate, 2-aminophenyl (meth)acrylate, 4-aminophenylmethyl (meth)acrylate, 3-aminophenylmethyl (meth)acrylate, and 2-aminophenylmethyl (meth)acrylate; (meth)acrylamides such as N-2-aminoethyl (meth)acrylamide, N-3-aminopropyl (meth)acrylamide, N-4-aminophenyl (meth)acrylamide, N-3-aminophenyl (meth)acrylamide, and N-2-aminophenyl (meth)acrylamide; aminostyrenes such as p-aminostyrene, m-aminostyrene, and o-aminostyrene; and aminoalkylstyrenes such as p-aminomethylstyrene, m-aminomethylstyrene, and o-aminomethylstyrene.

Comonomers are monomers other than the monomer having a primary amino group. Examples of comonomers include a compound represented by the following formula (a-I).

$$CH_2=CR^{a11}-CO-O-R^{a10}$$ (a-I)

In the formula (a-I), $R^{a10}$ is a monovalent organic group, and $R^{a11}$ is a hydrogen atom or a methyl group. The organic group includes a hydrocarbon group, and the hydrocarbon group may be an aliphatic hydrocarbon group or an aromatic hydrocarbon group. The structure of the aliphatic hydrocarbon group may be linear, branched, cyclic, or a combination of these structures. This organic group may include a bond or a substituent other than the hydrocarbon group such as a heteroatom, in the organic group.

The substituent other than the hydrocarbon group in the organic group of $R^{a11}$ is not particularly limited, as long as the effect of the present invention is not impaired. Specific examples of such a substituent include a halogen atom, a hydroxyl group, a mercapto group, a sulfide group, a cyano group, an isocyano group, a cyanato group, an isocyanato group, a thiocyanato group, an isothiocyanato group, a silyl group, a silanol group, an alkoxy group, an alkoxycarbonyl group, a carbamoyl group, a thiocarbamoyl group, a nitro group, a nitroso group, a carboxy group, a carboxylate group, an acyl group, an acyloxy group, a sulfino group, a sulfo group, a sulfonate group, a phosphino group, a phosphinyl group, a phosphono group, a phosphonato group, a hydroxyimino group, an alkyl ether group, an alkyl thioether group, an aryl ether group, an aryl thioether group, an N-monosubstituted amino group, and an N,N-disubstituted amino group. The hydrogen atom included in the above substituent may be substituted with a hydrocarbon group. The hydrocarbon group included in the above substituent may be any of linear, branched, and cyclic.

As $R^{a10}$, an alkyl group, an aryl group, an aralkyl group, or a heterocyclic group is preferable. These groups may be substituted with a halogen atom, a hydroxyl group, an alkyl group, or a heterocyclic group. When these groups include an alkylene moiety, the alkylene moiety may be interrupted by an ether bond, a thioether bond, or an ester bond.

When the alkyl group is a linear alkyl group or a branched alkyl group, the number of carbon atoms thereof is preferably 1 or more and 20 or less, more preferably 1 or more and 15 or less, and particularly preferably 1 or more and 10 or less. Preferable examples of the alkyl group include a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a n-hexyl group, a n-heptyl group, a n-octyl group, an isooctyl group, a sec-octyl group, a tert-octyl group, a n-nonyl group, an isononyl group, a n-decyl group, and an isodecyl group.

When the alkyl group is an alicyclic group or a group including an alicyclic group, preferred examples of the alicyclic group included in the alkyl group include monocyclic alicyclic groups such as a cyclopentyl group and a cyclohexyl group, and polycyclic alicyclic groups such as an adamantyl group, a norbornyl group, an isobornyl group, a tricyclononyl group, a tricyclodecyl group, and a tetracyclododecyl group.

Other preferable examples of comonomers include (meth)acrylamides, unsaturated carboxylic acids, allyl compounds, vinyl ethers, vinyl esters, and styrenes. These comonomers may be used alone or in combination of two or more.

Examples of the (meth)acrylamides include (meth)acrylamide; N-alkyl(meth)acrylamides such as N-methyl(meth)acrylamide, N-ethyl(meth)acrylamide, N-n-propyl(meth)acrylamide, N-isopropyl(meth)acrylamide, and N-n-butyl(meth)acrylamide; N-aryl(meth)acrylamides such as N-phenyl(meth)acrylamide, N-α-naphthyl(meth)acrylamide, and N-β-naphthyl(meth)acrylamide; N,N-dialkyl(meth)acrylamides such as N,N-dimethyl(meth)acrylamide, N,N-diethyl(meth)acrylamide, N,N-di-n-propyl(meth)acrylamide, and N,N-di-n-butyl(meth)acrylamide; N,N-diaryl(meth)acrylamides such as N,N-diphenyl(meth)acrylamide; and other N,N disubstituted(meth)acrylamides such as N-methyl-N-phenyl(meth)acrylamide and N-hydroxyethyl-N-methyl(meth)acrylamide.

Examples of the unsaturated carboxylic acids include monocarboxylic acids such as crotonic acid; dicarboxylic acids such as maleic acid, fumaric acid, citraconic acid, mesaconic acid, and itaconic acid; and anhydrides of these dicarboxylic acids.

Examples of the allyl compounds include allyl esters such as allyl acetate, allyl caproate, allyl caprylate, allyl laurate, allyl palmitate, allyl stearate, allyl benzoate, allyl acetoacetate, and allyl lactate; and allyloxy ethanol.

Examples of the vinyl ethers include alkyl vinyl ethers such as hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, and tetrahydrofurfuryl vinyl ether; and vinyl aryl ethers such as vinyl phenyl ether, vinyl tolyl ether, vinyl chlorophenyl ether, vinyl-2,4-dichlorophenyl ether, vinyl naphthyl ether, and vinyl anthranil ether.

Examples of the vinyl esters include vinyl butyrate, vinyl isobutyrate, vinyl trimethyl acetate, vinyl diethyl acetate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl-β-phenyl butyrate, vinyl benzoate, vinyl salicylate, vinyl chlorobenzoate, vinyl tetrachlorobenzoate, and vinyl naphthoate.

Examples of the styrenes include styrene; alkylstyrenes such as methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, and acetoxymethylstyrene; alkoxystyrenes such as methoxystyrene, 4-methoxy-3-methylstyrene, and dimethoxystyrene; and halostyrenes such as chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, and 4-fluoro-3-trifluoromethylstyrene.

When a monomer having a primary amino group is copolymerized with a comonomer, the ratio of the monomer having a primary amino group to the comonomer is not particularly limited. For example, the ratio thereof is such that the monomer having a primary amino group:the comonomer is preferably 5 to 50:50 to 95, more preferably 10 to 40:60 to 90, and further preferably 15 to 30:70 to 85, on a mole basis.

Examples of the compound represented by the formula (a2) include a compound represented by the following formula (a2-1):

[Chem. 6]

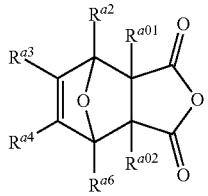

(a2-1)

wherein $R^{a01}$, $R^{a12}$, $R^{a2}$, $R^{a3}$, $R^{a4}$, and $R^{a6}$ are the same as $R^{a01}$, $R^{a02}$, $R^{a2}$, $R^{a3}$, $R^{a4}$, and $R^{a6}$ in the formula (a2).

The compound represented by the formula (a2) can be obtained by, for example, a Diels-Alder reaction between a compound represented by the following formula and a conjugated diene compound corresponding to the structure of the compound represented by the formula (a2).

The conditions of this Diels-Alder reaction may be appropriately set depending on the type of raw material used, and the reaction may be carried out in an organic solvent.

[Chem. 7]

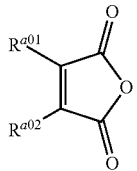

Examples of the organic solvent used in the Diels-Alder reaction include esters such as ethyl acetate, butyl acetate, and cellosolve acetate; ketones such as acetone, methyl ethyl ketone, isobutyl ketone, and methyl isobutyl ketone; esters such as ethyl acetate, butyl acetate, and diethyl malonate; amides such as N-methylpyrrolidone and N,N-dimethylformamide; ethers such as diethyl ether, ethyl cyclopentyl ether, tetrahydrofuran, and dioxane; aromatic hydrocarbons such as toluene and xylene; aliphatic hydrocarbons such as hexane, heptane, octane, and decahydronaphthalene, halogenated hydrocarbons such as methylene chloride and ethylene chloride; dimethylsulfoxide, and dimethylsulfoamide. As the organic solvent, one solvent may be used, or two or more solvents may be used in an arbitrary combination.

The reaction temperature is, for example, within a range of −10° C. to 200° C., preferably within a range of 0° C. to 150° C., and more preferably within a range of 5° C. to 120° C.

The reaction time is, for example, 5 minutes or more and 12 hours or less, 10 minutes or more and 10 hours or less, and 30 minutes or more and 8 hours or less.

The condensation in the first step is usually carried out using a condensing agent. Examples of dehydration condensing agents include carbodiimide compounds such as carbonyldiimidazole and N,N'-diisopropylcarbodiimide.

The addition of the condensing agent may be carried out in a reaction vessel in which the aforementioned Diels-Alder reaction has been carried out, or the addition thereof may be carried out by separately isolating the product obtained by the Diels-Alder reaction and dissolving the product again in an organic solvent and the like.

As the organic solvent used in the condensation, the same organic solvent as the organic solvent used in the Diels-Alder reaction may be employed.

The reaction temperature is, for example, within a range of −10° C. to 200° C., preferably within a range of 0° C. to 150° C., and more preferably within a range of 5° C. to 120° C.

The reaction time is, for example, 5 minutes or more and 12 hours or less, 10 minutes or more and 10 hours or less, and 30 minutes or more and 8 hours or less.

A compound having a group represented by the above formula (a3) that is obtained by conducting the first step may be isolated after conducting the first step.

When the compound having a group represented by the above formula (a3) is a resin, the isolation is carried out by, for example, pouring the reaction liquid after completion of the condensation in the first step into a poor solvent to solidify the compound, and then collecting the solid by filtration.

In the second step, the compound having a group represented by the above formula (a3) generated in the first step is heated, and the group represented by the above formula (a3) is converted into the group represented by the above formula (a1) (retro Diels-Alder reaction). As a result, the modified maleimide compound (A) having the group represented by the above formula (a1) can be obtained.

The group represented by the above formula (a1) may be introduced into some or the whole amino groups derived from the monomer having a primary amino group as the raw material compound, depending on the amount of the compound represented by the formula (a2) used.

The retro Diels-Alder reaction in the second step is carried out, for example, in an organic solvent. As the organic solvent, the same organic solvent as the organic solvent used in the aforementioned Diels-Alder reaction may be employed. To conduct the reaction by heating, the boiling point of the organic solvent is preferably 60° C. or more, more preferably 80° C. or more, and further preferably 100° C. or more. The upper limit value of the boiling point is not particularly limited, but is, for example, 350° C. or less.

With respect to the heating in the second step, the reaction temperature is, for example, within a range of 60° C. to 280° C., preferably within a range of 80° C. to 250° C., and more preferably within a range of 100° C. to 225° C.

The reaction time is, for example, 5 minutes or more and 12 hours or less, preferably 10 minutes or more and 10 hours or less, and more preferably 30 minutes or more and 8 hours or less.

The compound having the group represented by the above formula (a1) that can be obtained by conducting the second step may be isolated after conducting the second step.

When the compound having the group represented by the above formula (a1) is a resin, this isolation is carried out by, for example, pouring the reaction liquid after completion of the condensation in the second step into a poor solvent (e.g., an alcohol solvent) to solidify the compound, and then collecting the solid by filtration.

As an example of the production method of the modified maleimide compound (A), a reaction scheme in the case of using, as the raw material compound having a primary amino group, a copolymer of aminostyrene that is a monomer having a primary amino group and styrene that is a comonomer is shown below. In the following reaction scheme, the second step shows an example of performing reflux in toluene. In addition, m and n in the following reaction scheme represent the number of repetitions of each constitutional unit.

[Chem. 8]

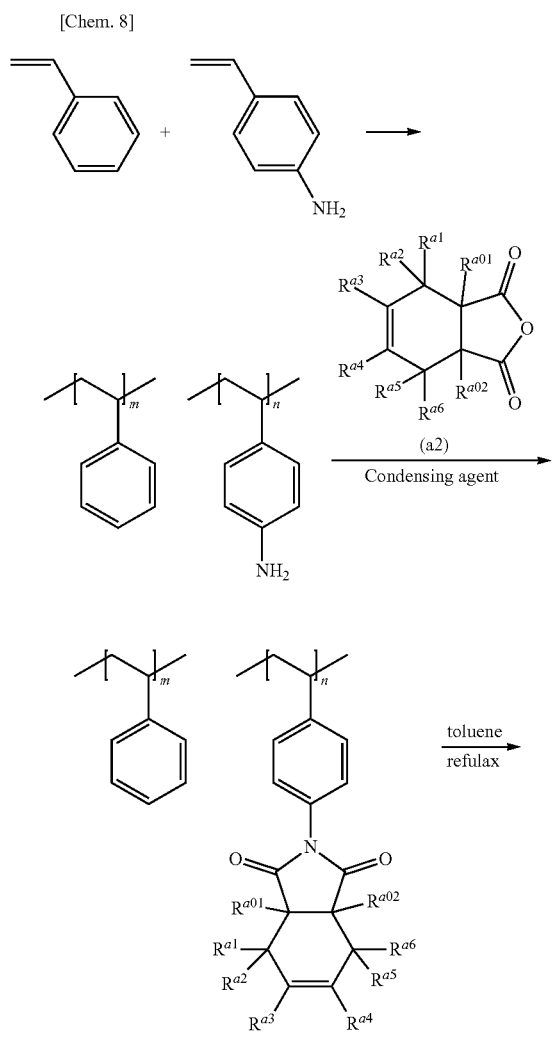

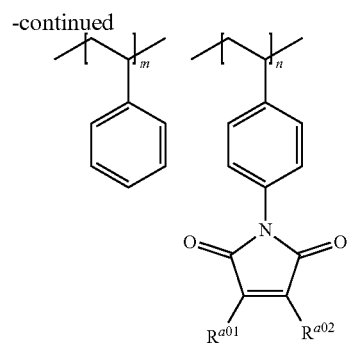

According to such a production method of the modified maleimide compound (A), side reactions other than the maleimidation are prevented. Particularly when the maleimide modified resin (A1) is produced, side reactions are prevented according to the above method, and as a result, the maleimide modified resin (A1) having the group represented by the formula (a1) can be obtained in a solid form. Thus, for example, the maleimide modified resin (A1) having the group represented by the formula (a1) can be blended in the above curable composition as a solid resin. For example, it has conventionally been impossible to obtain a polymer of a monomer having an unsaturated double bond and including a group represented by the above formula (a1) at a side chain terminal, due to the problem of gelation. Specifically, for example, a method of reacting a styrene resin having an amino group with a maleic anhydride to achieve ring closure causes gelation and a solid resin has not been obtained. This is considered to be caused by the fact that side reactions other than the desired maleimidation are likely to occur. However, according to the above production method, a polymer of a monomer having an unsaturated double bond and including a group represented by the above formula (a1) can be obtained as a solid resin.

Note that in the specification of the present application, the substituted or unsubstituted cyclic imido group represented by the formula (a1) is also referred to as the "maleimide group" for convenience.

According to the above production method, the group represented by the formula (a1) is introduced by using a polymer that has been polymerized as the raw material compound in advance and reacting a primary amino group in the polymer, instead of polymerizing a monomer into which a maleimide group has been introduced, and therefore, polymerization is not limited to a time-consuming cationic polymerization. Therefore, the above production method is a convenient method.

After a primary amino group and the dicarboxylic anhydride represented by the formula (a2) are condensed to generate the group represented by the formula (a3), the obtained compound is heated so that the group represented by the formula (a3) is converted to the group represented by the formula (a1). Therefore, the group represented by the formula (a1) can be introduced in a convincing way without causing any problems due to the ring closure reaction.

<Maleimide Modified Polyphenylene Ether Resin (A1-1)>

Hereinbefore, with respect to the modified maleimide compound (A), the maleimide modified resin (A1) has mainly been described, but the maleimide modified polyphenylene ether resin (A1-1) having the group represented by the formula (a1) is also preferable as the maleimide modified resin (A1). The maleimide modified polyphenylene ether resin (A1-1) is preferably a resin in which a terminal of the molecular chain of an unmodified polyphenylene ether resin is modified with a terminal group including the group represented by the formula (a1). The structure of the terminal group including the group represented by the formula (a1) is not particularly limited within a range not inhibiting the purpose of the present invention.

The phenylene group included in the main chain of the maleimide modified polyphenylene ether resin (A1-1) may have 1 or more and 4 or less substituents.

When the maleimide modified polyphenylene ether resin (A1-1) has a terminal group including a group represented by the formula (a1), the terminal group is preferably bonded to the main chain of the maleimide modified polyphenylene ether resin (A1-1) via a linking group represented by the following formula (Ai):

   (Ai).

The bond on the ** side in the linking group is bonded to an oxygen atom derived from a hydroxyl group at a terminal of the molecular chain of an unmodified polyphenylene ether resin that yields the maleimide modified polyphenylene ether resin (A1-1). On the other hand, the bond on the * side in the linking group is bonded to the terminal group.

In the formula (Ai), $Y^1$ is a single bond or a carbonyl group. $Y^2$ is a divalent organic group. When $Y^1$ is a single bond, the single bond as $Y^1$ is bonded to a carbon atom having an sp3 hybrid orbital in the divalent organic group as $Y^2$.

In the formula (Ai), when $Y^1$ is a carbonyl group, $Y^2$ is preferably a group represented by —$Y^4$—$Y^3$—. $Y^3$ is a single bond, —O—, or —NH—. $Y^4$ is preferably a divalent organic group. $Y^3$ is bonded to a carbonyl group as $Y^1$.

That is, when $Y^1$ in the formula (Ai) is a carbonyl group, the linking group represented by the formula (Ai) is preferably a group represented by any of the following formulas (Ai-1) to (Ai-3).

   (Ai-1)

   (Ai-2)

   (Ai-3)

The divalent organic group as $Y^4$ is not particularly limited, as long as it is a group capable of linking $Y^3$ with the terminal group represented by the formula (a1). The structure of the organic group may be linear, branched, cyclic, or a combination of these structures. Examples of a heteroatom other than a carbon atom and a hydrogen atom that may be contained in the organic group include a nitrogen atom, a sulfur atom, an oxygen atom, a halogen atom, a phosphorus atom, a silicon atom, and a boron atom. The organic group may have one or more unsaturated bonds.

Since, for example, a compound used in the terminal modification of the maleimide modified polyphenylene ether resin (A1-1) is easily available or produced and the desired terminal modification is easily achieved, $Y^4$ is preferably a hydrocarbon group.

The number of carbon atoms in the hydrocarbon group is preferably 1 or more and 10 or less, more preferably 1 or more and 8 or less, and further preferably 1 or more and 6 or less. The hydrocarbon group may be an aliphatic hydrocarbon group or an aromatic hydrocarbon group.

The hydrocarbon group is preferably an aliphatic hydrocarbon group, which is flexible as compared with a rigid aromatic hydrocarbon group.

Examples of the hydrocarbon group that is preferred as $Y^4$ include a methylene group, an ethane-1,2-diyl group, an ethane-1,1-diyl group, a propane-1,3-diyl group, a propane-1,2-diyl group, a propane-1,1-diyl group, a butane-1,4-diyl group, a pentane-1,5-diyl group, a hexane-1,6-diyl group, a heptane-1,7-diyl group, an octane-1,8-diyl group, a nonane-1,9-diyl group, a decane-1,10-diyl group, a cyclohexane-1,4-diyl group, a cyclohexane-1,3-diyl group, a cyclohexane-1,2-diyl group, a p-phenylene group, a m-phenylene group, an o-phenylene group, a naphthalene-1,4-diyl group, a naphthalene-2,6-diyl group, and a naphthalene-2,7-diyl group.

Among these, an ethane-1,2-diyl group, a propane-1,3-diyl group, a butane-1,4-diyl group, a cyclohexane-1,4-diyl group, and a cyclohexane-1,3-diyl group are preferable.

In the formula (Ai), when $Y^1$ is a single bond, the single bond as $Y^1$ is bonded to a carbon atom having an sp3 hybrid orbital in the divalent organic group as $Y^2$. Typically, the carbon atom having an sp3 hybrid orbital is the carbon atom that constitutes an entire structure or partial structure consisting of an aliphatic hydrocarbon group, in the organic group as $Y^2$.

In the formula (Ai), when $Y^1$ is a single bond, the divalent organic group as $Y^2$ is not particularly limited, as long as the divalent organic group has at least one carbon atom having an sp3 hybrid orbital and is a group capable of linking an oxygen atom derived from a hydroxyl group at a terminal of the molecular chain of an unmodified polyphenylene ether resin that yields a terminally maleimide-modified polyphenylene ether resin (A1-1) and the terminal group represented by the formula (a1). The divalent organic group as $Y^2$ when $Y^1$ is a single bond may include one or more heteroatoms such as a nitrogen atom, a sulfur atom, an oxygen atom, a halogen atom, a phosphorus atom, a silicon atom, and a boron atom, other than a carbon atom and a hydrogen atom.

When $Y^1$ is a single bond, the number of carbon atoms of the divalent organic group as $Y^2$ is preferably 1 or more and 10 or less, more preferably 1 or more and 8 or less, and further preferably 1 or more and 6 or less.

When $Y^1$ is a single bond, the divalent organic group as $Y^2$ is preferably an aliphatic hydrocarbon group in which one or more methylene groups may be substituted with a carbonyl group (—CO—), an ether bond (—O—), or an imino group (—NH—).

When $Y^1$ is a single bond, preferable examples of the aliphatic hydrocarbon group as $Y^2$ include a methylene group, an ethane-1,2-diyl group, an ethane-1,1-diyl group, a propane-1,3-diyl group, a propane-1,2-diyl group, a propane-1,1-diyl group, a butane-1,4-diyl group, a pentane-1,5-diyl group, a hexane-1,6-diyl group, a heptane-1,7-diyl group, an octane-1,8-diyl group, a nonane-1,9-diyl group, a decane-1,10-diyl group, a cyclohexane-1,4-diyl group, a cyclohexane-1,3-diyl group, and a cyclohexane-1,2-diyl group. Groups in which one or two methylene groups included in these hydrocarbon groups are substituted with a carbonyl group (—CO—), an ether bond (—O—), or an imino group (—NH—) are also preferable.

Among these, an ethane-1,2-diyl group, a propane-1,3-diyl group, a butane-1,4-diyl group, a cyclohexane-1,4-diyl group, and a cyclohexane-1,3-diyl group are preferable.

The method for introducing the terminal group represented by the formula (a1) at a terminal of a molecular chain of the unmodified polyphenylene ether resin to modify the resin is not particularly limited.

To carry out such a modification, the unmodified polyphenylene ether resin having a phenolic hydroxyl group terminal is preferably used.

The unmodified polyphenylene ether resin is only required to be a resin having at least one phenolic hydroxyl group terminal. The unmodified polyphenylene ether resin preferably has two or more phenolic hydroxyl group terminals, more preferably two or three phenolic hydroxyl group terminals, and further preferably two phenolic hydroxyl group terminals.

When the unmodified polyphenylene ether resin has a phenolic hydroxyl group at a terminal, the unmodified polyphenylene ether resin may further have a phenolic hydroxyl group on the phenylene group included in the main chain.

Typically, the polyphenylene ether resin may be produced by oxidatively polymerizing a phenolic compound such as 2,6-dimethylphenol in the presence of a catalyst including a metal such as copper. The production method of the unmodified polyphenylene ether resin is not particularly limited, but the unmodified polyphenylene ether resin is preferably produced according to a publicly known method, that is, according to the aforementioned typical method.

The phenylene group included in the main chain of the maleimide modified polyphenylene ether resin (A1-1) may have 1 or more and 4 or less substituents. Thus, the phenylene group included in the main chain of the unmodified polyphenylene ether resin may have 1 or more and 4 or less substituents.

Preferable examples of the substituent include an alkyl group having 1 or more and 4 or less carbon atoms such as a methyl group, an ethyl group, a n-propyl group, an isopropyl group, a n-butyl group, an isobutyl group, a sec-butyl group, and a tert-butyl group; an aromatic hydrocarbon group such as a phenyl group, an o-tolyl group, a m-tolyl group, and a p-tolyl group; an alkoxy group having 1 or more and 4 or less carbon atoms such as a methoxy group, an ethoxy group, a n-propyloxy group, an isopropyloxy group, a n-butyloxy group, an isobutyloxy group, a sec-butyloxy group, and a tert-butyloxy group; a phenolic hydroxyl group; and a halogen atom such as a fluorine atom, a chlorine atom, a bromine atom, and an iodine atom.

Among these substituents, a methyl group, a phenyl group, a chlorine atom, and a bromine atom are preferable, and a methyl group, a phenyl group, and a chlorine atom are more preferable.

Examples of the unmodified polyphenylene ether resin include homopolymers of phenols or copolymers of two or more phenols.

The unmodified polyphenylene ether resin may be a polymer obtained by polymerizing only a monohydric phenol, or may be a polymer obtained by copolymerizing a monohydric phenol and a polyhydric phenol such as a dihydric phenol and a trihydric phenol.

The polymer made of only a monohydric phenol has an aryl group derived from a raw material phenol having no hydroxyl group at one terminal, and a hydroxyaryl group derived from a raw material phenol at the other terminal.

In the copolymer of a monohydric phenol and a polyhydric phenol, the molecular chain of polyphenylene ether grows from two or more phenolic hydroxyl groups in the polyhydric phenol as a starting point. Thus, when a monohydric phenol is copolymerized with a dihydric phenol, a polyphenylene ether resin having hydroxyaryl groups at both terminals is obtained. When a monohydric phenol is copolymerized with a trihydric or higher phenol, a polyphenylene ether resin having branched chains corresponding to the valence of the polyhydric phenol and having a hydroxyaryl group at the terminal of each branched chain is obtained.

Specific examples of the homopolymer of phenols include poly(2,6-dimethyl-1,4-phenylene ether), poly(2-methyl-6-phenyl-1,4-phenylene ether), and poly(2,6-dichloro-1,4-phenylene ether).

As mentioned above, the copolymer of two or more phenols may be a copolymer of two or more monohydric phenols, or a copolymer of one or more monohydric phenols and one or more dihydric phenols.

Specific examples of the copolymer of two or more monohydric phenols include a copolymer of 2,6-dimethylphenol and 2,3,6-trimethylphenol, a copolymer of 2,6-dimethylphenol and 2,6-dichlorophenol, and a copolymer of 2,6-dimethylphenol and 2-methyl-6-phenylphenol.

Examples of the copolymer of one or more monohydric phenols and one or more dihydric phenols include a copolymer obtained by polymerizing 2,6-dimethylphenol with 3,3',5,5'-tetramethyl bisphenol A, a copolymer obtained by polymerizing 2-methyl-6-phenylphenol with 3,3',5,5'-tetramethyl bisphenol A, and a copolymer obtained by polymerizing 2,6-dichlorophenol with 3,3',5,5'-tetramethyl bisphenol A.

As the unmodified polyphenylene ether resin, the copolymer obtained by polymerizing 2,6-dimethylphenol with 3,3',5,5'-tetramethyl bisphenol A, the copolymer obtained by polymerizing 2-methyl-6-phenylphenol with 3,3',5,5'-tetramethyl bisphenol A, and the copolymer obtained by polymerizing 2,6-dichlorophenol with 3,3',5,5'-tetramethyl bisphenol A, which are copolymers of a monohydric phenol and a dihydric phenol, are preferable, and the copolymer obtained by polymerizing 2,6-dimethylphenol with 3,3',5,5'-tetramethyl bisphenol A is more preferable.

The method for modifying the unmodified polyphenylene ether resin and introducing the terminal group represented by the formula (a1) at the terminal is not particularly limited.

For example, when $Y^1$ is a carbonyl group in the formula (Ai) and the linking group represented by the formula (Ai) is a group represented by the following formula (Ai-1):

$$*-Y^4-CO-** \qquad (Ai\text{-}1)$$

a carboxylic acid represented by MIG-$Y^4$—CO—OH and the phenolic hydroxyl group included in the unmodified polyphenylene ether resin are condensed with a condensing agent such as a carbodiimide compound such as carbonyldiimidazole and N,N'-diisopropylcarbodiimide, so that the terminal phenolic hydroxyl group included in the unmodified polyphenylene ether resin can be converted to a group represented by —O—CO—$Y^4$-MIG. Note that MIG is the terminal group represented by the formula (a1).

Also, a carboxylic acid halide represented by MIG-$Y^4$—CO-Hal is reacted with the phenolic hydroxyl group included in the unmodified polyphenylene ether resin, so that the terminal phenolic hydroxyl group included in the unmodified polyphenylene ether resin can be converted to the group represented by —O—CO—$Y^4$-MIG. Note that Hal is a halogen atom such as a chlorine atom and a bromine atom.

When $Y^1$ is a carbonyl group in the formula (Ai) and the linking group represented by the formula (Ai) is a group represented by the following formula (Ai-2):

$$*-Y^4-O-CO-** \qquad (Ai\text{-}2)$$

the phenolic hydroxyl group included in the unmodified polyphenylene ether resin and an alcohol represented by MIG-$Y^4$—OH in an excess amount relative to the phenolic hydroxyl group are reacted with a compound that produces a carbonate bond such as phosgene and triphosgene, so that the terminal phenolic hydroxyl group included in the unmodified polyphenylene ether resin can be converted to a group represented by —O—CO—O—Y⁴-MIG.

When $Y^1$ is a carbonyl group in the formula (Ai), and the linking group represented by the formula (Ai) is a group represented by the following formula (Ai-3):

*—Y⁴—NH—CO—** (Ai-3)

the phenolic hydroxyl group included in the unmodified polyphenylene ether resin is reacted with an isocyanate represented by MIG-Y⁴—NCO, so that the terminal phenolic hydroxyl group included in the unmodified polyphenylene ether resin can be converted to a group represented by —O—CO—NH—Y⁴-MIG.

When $Y^1$ is a single bond in the formula (Ai), the phenolic hydroxyl group included in the unmodified polyphenylene ether resin and a halide represented by MIG-Y²-Hal are etherified by a method such as the so-called Williamson ether synthesis, so that the terminal phenolic hydroxyl group included in the unmodified polyphenylene ether resin can be converted to a group represented by —O—Y²-MIG.

Hereinbefore, representative methods for modifying the phenolic hydroxyl group are described, but the method for modifying the phenolic hydroxyl group is not limited to these methods. As the method for modifying the phenolic hydroxyl group, various known methods may be employed according to the structure of the linking group bonded to the terminal group represented by the formula (a1).

In the above modification methods, an organic solvent may be appropriately used according to the reaction employed, as needed. Also, with respect to the reaction temperature and the reaction time, known suitable conditions in the reaction employed may be appropriately employed.

When the maleimide modified polyphenylene ether resin (A1-1) is prepared using an unmodified polyphenylene ether resin, a group including the terminal group represented by the formula (a1) may be introduced into some of the phenolic hydroxyl groups included in the unmodified polyphenylene ether resin or a group including the terminal group represented by the formula (a1) may be introduced into all the phenolic hydroxyl groups.

The molecular weight of the maleimide modified polyphenylene ether resin (A1-1) is not particularly limited, as long as the effect of the present invention is not impaired. The mass average molecular weight (Mw) is preferably 2,000 or more, more preferably 2,500 or more, and further preferably 3,000 or more. The molecular weight of the maleimide modified polyphenylene ether resin (A1-1) is preferably 100,000 or less, more preferably 80,000 or less, further preferably 50,000 or less, and further more preferably 10,000 or less as the mass average molecular weight (Mw).

Hereinbefore, the maleimide modified resin (A1) having the group represented by the formula (a1) has been described, and examples of the maleimide modified monomer (A2) having the group represented by the formula (a1) which is a modified maleimide compound (A) other than the maleimide modified resin (A1) include bismaleimide compounds in which two amino groups in an aromatic diamine or an aliphatic diamine are substituted with a group represented by the formula (a1).

Specific examples of the aromatic diamine include p-phenylenediamine, m-phenylenediamine, 2,4-diaminotoluene, 4,4'-diaminobiphenyl, 4,4'-diamino-2,2'-bis(trifluoromethyl)biphenyl, 3,3'-diaminodiphenylsulfone, 4,4'-diaminodiphenylsulfone, 4,4'-diaminodiphenylsulfide, 4,4'-diaminodiphenylmethane, 4,4'-diaminodiphenyl ether, 3,4'-diaminodiphenyl ether, 3,3'-diaminodiphenyl ether, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl]sulfone, bis[4-(3-aminophenoxy)phenyl]sulfone, 2,2-bis[4-(4-aminophenoxy)phenyl]propane, and 2,2-bis[4-(4-aminophenoxy)phenyl]hexafluoropropane.

Specific examples of the aliphatic diamine include pentamethylene diamine, hexamethylene diamine, heptamethylene diamine, and 2,3,3-trimethylpentane-1,5-diamine.

Examples of the maleimide modified monomer (A2) which is commercially available and highly available include 2,2-bis[4-(4-maleimidephenoxy)phenyl]propane, the following compounds (all manufactured by Tokyo Kasei Kogyo Co., Ltd.), and BMI-689, BMI-1400, BMI-1500, BMI-1700, BMI-2700, and BMI-3000 (all manufactured by Designer molecules Inc.).

[Chem. 9]

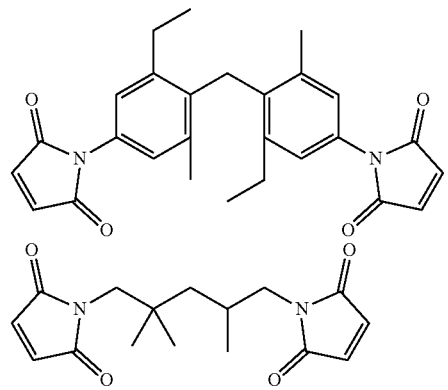

Thus, since the terminal group represented by the formula (a1) is a radically polymerizable group, the modified maleimide compound (A) having the terminal group represented by the formula (a1) at a terminal of the molecular chain can be polymerized by exposure or heating. As a result of polymerization, the modified maleimide compound (A) yields an insulating film having a low dielectric constant and a low dielectric loss tangent as well as excellent heat resistance. For example, the dielectric constant of the insulating film to be formed may be less than 3.00. The dielectric loss tangent of the insulating film to be formed may be less than 0.01. The glass transition temperature (Tg) of the insulating film to be formed may be 150° C. or more.

The curable composition including the modified maleimide compound (A) has excellent film formation properties by coating. Thus, when a film is formed by coating using such a curable composition, no crack and no crystal are generated, no tackiness (stickiness) is present, and the compatibility of the components is good. Thus, an insulating film can be formed by coating which is an easy method.

The modified maleimide compound (A) has excellent solvent solubility. Thus, the curable composition including the modified maleimide compound (A) is applicable to a development process with a solvent, as a negative composition.

In particular, the modified maleimide compound (A) may be soluble in an alkaline aqueous solution, although it depends on its structure. An example thereof is a case where the modified maleimide compound (A) has an alkali-soluble group such as a carboxy group and a phenolic hydroxyl group. The curable composition including such an alkali-soluble modified maleimide compound (A) is applicable to an alkali development process, as a negative composition.

By applying a position-selective exposure and the above development process to a coating film made of the curable composition including the modified maleimide compound (A), a cured film having a desired pattern shape can be formed.

The content of the modified maleimide compound (A) in the curable composition is not particularly limited. The content of the modified maleimide compound (A) is preferably 5% by mass or more and 100% by mass or less based on the total solid content of the curable composition.

When the curable composition includes the maleimide modified resin (A1) and the maleimide modified monomer (A2) as the modified maleimide compounds (A), the ratio W1:W2 of the mass of the maleimide modified resin (A1), W1 to the mass of the maleimide modified monomer (A2), W2 is preferably 10:90 to 90:10, and more preferably 20:80 to 80:20. The ratio W1:W2 may be 30:70 to 70:30, and may be 40:60 to 60:40.

[Radically Polymerizable Compound (B)]

The curable composition may further include the radically polymerizable compound (B). Of course, the curable composition may not include the radically polymerizable compound (B). The radically polymerizable compound (B) is a radically polymerizable compound other than the modified maleimide compound (A).

The radically polymerizable compound (B) may be a compound having an unsaturated double bond, such as styrene, a styrene polymer, acrylonitrile, (meth)acrylic acid, and a (meth)acrylic acid ester.

As the above radically polymerizable compound, various radically polymerizable compounds conventionally blended in the radically polymerizable compositions may be used without particular limitation. Specific examples of the radically polymerizable compounds other than the maleimide compound include the following compounds.

Examples of monofunctional radically polymerizable compounds include (meth)acrylamide, methylol (meth)acrylamide, methoxymethyl (meth)acrylamide, ethoxymethyl (meth)acrylamide, propoxymethyl (meth)acrylamide, butoxymethoxymethyl (meth)acrylamide, N-methylol (meth)acrylamide, N-hydroxymethyl (meth)acrylamide, (meth)acrylic acid, fumaric acid, maleic acid, maleic anhydride, itaconic acid, itaconic anhydride, citraconic acid, citraconic anhydride, crotonic acid, 2-acrylamide-2-methylpropanesulfonic acid, tert-butylacrylamidesulfonic acid, methyl (meth)acrylate, ethyl (meth)acrylate, butyl (meth)acrylate, 2-ethylhexyl (meth)acrylate, cyclohexyl (meth)acrylate, 2-hydroxyethyl (meth)acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, glycerin mono(meth)acrylate, tetrahydrofurfuryl (meth)acrylate, dimethylamino (meth) acrylate, glycidyl (meth)acrylate, 2,2,2-trifluoroethyl (meth)acrylate, 2,2,3,3-tetrafluoropropyl (meth)acrylate, and half (meth)acrylate of a phthalic acid derivative. These monofunctional compounds may be used alone or in combination of two or more.

Examples of polyfunctional radically polymerizable compounds include 1,3-butanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, 1,12-dodecanediol di(meth)acrylate, ethoxylated hexanediol di(meth)acrylate, tricyclodecane dimethanol di(meth)acrylate, 2-hydroxy-3-(meth)acryloyloxypropyl (meth)acrylate, dipentaerythritol di(meth)acrylate, diethylene glycol di(meth)acrylate, triethylene glycol di(meth) acrylate, dipropylene glycol di(meth)acrylate, tripropylene glycol di(meth)acrylate, ethoxylated neopentyl glycol di(meth)acrylate, polyethylene glycol di(meth)acrylate, poly (ethylene-propylene) glycol di(meth)acrylate, polytetramethylene glycol di(meth)acrylate, ethoxylated bisphenol A di(meth)acrylate, propoxylated bisphenol A di(meth)acrylate, propoxylated ethoxylated bisphenol A di(meth)acrylate, ethylene glycol di(meth)acrylate, diethylene glycol di(meth) acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth)acrylate, trimethylolpropane tri(meth)acrylate, glycerin di(meth)acrylate, pentaerythritol triacrylate, pentaerythritol tetraacrylate, dipentaerythritol pentaacrylate, dipentaerythritol hexaacrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, 2,2-bis(4-(meth)acryloxydiethoxyphenyl) propane, 2,2-bis(4-(meth)acryloxypolyethoxyphenyl) propane, 2-hydroxy-3-(meth)acryloyloxypropyl (meth) acrylate, ethylene glycol diglycidyl ether di(meth)acrylate, diethylene glycol diglycidyl ether di(meth)acrylate, phthalic acid diglycidyl ester di(meth)acrylate, glycerin triacrylate, glycerin polyglycidyl ether poly(meth)acrylate, urethane (meth)acrylate (that is, tolylene diisocyanate), a reactant of trimethylhexamethylene diisocyanate, hexamethylene diisocyanate, and the like with 2-hydroxyethyl (meth)acrylate, methylenebis (meth)acrylamide, (meth)acrylamide methylene ether, a condensate of a polyhydric alcohol and N-methylol (meth)acrylamide, triacrylformal, 2,4,6-trioxohexahydro-1,3,5-triazine-1,3,5-trisethanol triacrylate, and 2,4,6-trioxohexahydro-1,3,5-triazine-1,3,5-trisethanol diacrylate. These polyfunctional compounds may be used alone or in combination of two or more.

The content of the radically polymerizable compound (B) in the curable composition is not particularly limited, but is preferably 10% by mass or more 70% by mass or less, based on the total amount of the modified maleimide compound (A) and the radically polymerizable compound (B).

[Radical Generator (C)]

The curable composition includes the radical generator (C). The radical generator (C) may be a photoradical generator (C1) or a thermal radical generator (C2), and the photoradical generator (C1) and the thermal radical generator (C2) may be used in combination.

Examples of the photoradical generator (C1) include alkylphenone photoradical generators such as Omnirad 651, Omnirad 184, Omnirad 1173, Omnirad 2959, Omnirad 127, Omnirad 907, Omnirad 369, Omnirad 369E, and Omnirad 379EG (all of which are manufactured by IGM Resins B.V.), acylphosphine oxide photoradical generators such as Omnirad TPO H and Omnirad 819 (both are manufactured by IGM Resins B.V.), and oxime ester photopolymerization initiators such as Irgacure OXE01 and Irgacure OXE02 (both are manufactured by BASF).

Specific examples of the photoradical generator (C1) include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1,2-diphenylethan-1-one, bis(4-dimethylaminophenyl)ketone, 2-methyl-1-[4-(methylthio) phenyl]-2-morpholinopropan-1-one, 2-benzyl-2- dimethylamino-1-(4-morpholinophenyl)-butan-1-one, 1,2-octanedione, 1-[4-(phenylthio)phenyl]-,2-(O-benzoyloxime) (Irgacure OXE01), ethanone-1-[9-ethyl-6-(2-methylbenzoyl)-9H-carbazol-3-yl]-1-(O-acetyloxime) (Irgacure OXE02), 2,4,6-trimethylbenzoyl diphenylphosphine oxide (Omnirad TPOH), bis(2,4,6-trimethylbenzoyl)phenylphosphine oxide (Omnirad 819), 4-benzoyl-4'-methyl dimethyl sulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexylbenzoic acid, 4-dimethylamino-2-isoamylbenzoic acid, benzyl-β-methoxyethyl acetal, benzyl dimethyl ketal, 1-phenyl-1,2-propanedione-2-(0-ethoxycarbonyl)oxime, methyl O-benzoylbenzoate, 2,4-diethylthioxanthone, 2-chlorothioxanthone, 2,4-dimethylthioxanthone, 1-chloro-4-propoxythioxanthone, thioxanthene, 2-chlorothioxanthene, 2,4-diethylthioxanthene, 2-methylthioxanthene, 2-isopropylthioxanthene, 2-ethylanthraquinone, octamethylanthraquinone, 1,2-benzanthraquinone, 2,3-diphenylanthraquinone, azobisisobutyronitrile, benzoylperoxide, cumene hydroperoxide, 2-mercaptobenzimidazole, 2-mercaptobenzoxazole, 2-mercaptobenzothiazole, 2-(O-chlorophenyl)-4,5-di(m-methoxyphenyl)-imidazolyl dimer, benzophenone, 2-chlorobenzophenone, p,p'-bisdimethylaminobenzophenone, 4,4'-bisdiethylaminobenzophenone, 4,4'-dichlorobenzophenone, 3,3-dimethyl-4-methoxybenzophenone, benzyl, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyltrichloroacetophenone, p-tert-butyldichloroacetophenone, α,α-dichloro-4-phenoxyacetophenone, thioxanthone, 2-methylthioxanthone, 2-isopropylthioxanthone, dibenzosuberone, pentyl-4-dimethylaminobenzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy)styrylphenyl-s-triazine, and 2,4-bis-trichloromethyl-6-(2-bromo-4-methoxy)styrylphenyl-s-triazine. These photoradical generators may be used alone or in combination of two or more. Among these, an oxime photoradical generator is particularly preferably used in terms of sensitivity.

Examples of the thermal radical generator (C2) include organic peroxides such as ketone peroxides (e.g., methyl ethyl ketone peroxide and cyclohexanone peroxide), peroxyketals (e.g., 2,2-bis(tert-butylperoxy)butane and 1,1-bis(tert-butylperoxy)cyclohexane), hydroperoxides (tert-butylhydroperoxide and cumene hydroperoxide), dialkyl peroxides (e.g., di-tert-butylperoxide (PERBUTYL® D (manufactured by NOF CORPORATION) and di-tert-hexyl peroxide (PERHEXYL® D (manufactured by NOF CORPORATION))), diacyl peroxides (e.g., isobutyrylperoxide, lauroylperoxide, and benzoylperoxide), peroxydicarbonates (e.g., diisopropylperoxydicarbonate), and peroxyesters (e.g., tert-butylperoxyisobutyrate and 2,5-dimethyl-2,5-di(benzoylperoxy)hexane)}, and azo compounds such as 1,1'-azobis (cyclohexane-1-carbonitrile), 2,2'-azobisisobutyronitrile, 2,2'-azobis(2,4-dimethyl-4-methoxyvaleronitrile), 2,2'-azobis(2-methylpropionamidine)dihydrochloride, 2,2'-azobis[2-methyl-N-(2-propenyl)propionamidine]dihydrochloride, 2,2'-azobis(2-methylpropionamide), 2,2'-azobis[2-methyl-N-(2-hydroxyethyl)propionamide], 2,2'-azobis(2-methylpropane), 2,2'-azobis(2,4,4-trimethylpentane), and dimethyl 2,2'-azobis(2-methylpropionate)}.

The content of the radical generator (C) in the curable composition is not particularly limited, and is preferably 0.1 parts by mass or more and 10 parts by mass or less, more preferably 0.5 parts by mass or more and 10 parts by mass or less, and further preferably 2 mass or more and 10 parts by mass or less, per 100 parts by mass in total of the modified maleimide compound (A) and the radically polymerizable compound (B).

<Thiol Compound (D)>

The curable composition includes the thiol compound (D) together with the modified maleimide compound (A). As a result, the curable composition yields a cured product having excellent elongation and tensile strength.

The number of mercapto groups in the thiol compound (D) is not particularly limited. The number of mercapto groups in the thiol compound (D) is preferably 2 or more, more preferably 2 or more and 10 or less, and further preferably 2 or more and 6 or less from the viewpoint that a cured product having excellent elongation and tensile strength is more easily obtained.

Specific examples of compounds having two or more mercapto groups include 1,2-benzenedithiol, 1,3-benzenedithiol, 1,4-benzenedithiol, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol, 2,4-di(p-mercaptophenyl)pentane, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, and 1,3,5-tris(mercaptoethylthio)benzene.

As the thiol compound (D) having two or more mercapto groups, mercaptoalkanoate of a polyol having two or more hydroxyl groups is preferable from the viewpoint of easy availability and easy synthesis, dissolution stability in the curable composition, and the like.

The mercaptoalkanoate of a polyol having two or more hydroxyl groups may have a hydroxyl group, but preferably has no hydroxyl group.

The number of carbon atoms of mercaptoalkanoic acid that yields mercaptoalkanoate is not particularly limited, but is preferably 2 or more and 6 or less, and preferably 3 or 4. Specific examples of the mercaptoalkanoic acid that yields mercaptoalkanoate include thioglycolic acid, 2-mercaptopropionic acid, 3-mercaptopropionic acid, 2-mercaptobutanoic acid, 3-mercaptobutanoic acid, 4-mercaptobutanoic acid, 2-mercaptopentanoic acid, 3-mercaptopentanoic acid, 4-mercaptopentanoic acid, 5-mercaptopentanoic acid, 2-mercaptohexanoic acid, 3-mercaptohexanoic acid, 4-mercaptohexanoic acid, and 5-mercaptohexanoic acid.

Among these, 2-mercaptopropionic acid and 3-mercaptobutanoic acid are preferable.

The polyol that yields mercaptoalkanoate may include an aromatic group.

Examples of the polyol including no aromatic group include ethylene glycol, 1,3-propanediol, propylene glycol, 1,4-butanediol, 1,5-pentanediol, 1,6-hexanediol, 1,7-heptanediol, 1,8-octanediol, 1,9-nonanediol, 1,10-decanediol, diethylene glycol, triethylene glycol, tetraethylene glycol, dipropylene glycol, tripropylene glycol, tetrapropylene glycol, 1,4-cyclohexanediol, 1,3-cyclohexanediol, 1,2-cyclohexanediol, 1,4-cyclohexanedimethanol, hydrogenated bisphenol A, glycerin, diglycerin, triglycerin, trimethylolethane, trimethylolpropane, pentaerythritol, dipentaerythritol, sorbitol, mannitol, sorbitan, sucrose, glucose, mannose, methyl glucoside, and tris(2-hydroxyethyl) isocyanurate.

Examples of the aromatic polyol include benzenediols such as hydroquinone, resorcinol, and catechol; benzenetriols such as phloroglucinol, pyrogallol, and 1,2,4-benzenetriol; naphthalenediols such as 1,2-naphthalenediol, 1,3-naphthalenediol, 1,4-naphthalenediol, 1,5-naphthalenediol, 1,6-naphthalenediol, 1,7-naphthalenediol, 1,5-naphthalenediol, 2,3-naphthalenediol, 2,6-naphthalenediol, and 2,7-naphthalenediol; naphthalenetriols such as 1,4,5-naphthalenetriol, 1,2,4-naphthalenetriol, 1,3,8-naphthalenetriol, and 1,2,7-naphthalenetriol; bisphenols such as bisphenol A, bisphenol AP, bisphenol AF, bisphenol B, bisphenol BP, bisphenol C, bisphenol E, bisphenol F, bisphenol S, and bisphenol Z; tetrahydroxybiphenyls such as 3,3',4,4'-tetrahydroxybiphenyl and 3,3',5,5'-tetrahydroxybiphenyl; calixarenes; and novolac resin such as phenol novolac, cresol novolac, and naphthol novolac.

Among the above polyols, ethylene glycol, 1,3-propanediol, propyleneglycol, 1,4-butanediol, 1,5-pentanediol, 1,6-hexanediol, diethylene glycol, dipropylene glycol, glycerin, diglycerin, trimethylolethane, trimethylolpropane, pentaerythritol, dipentaerythritol, and tris(2-hydroxyethyl) isocyanurate are preferable, and 1,4-butanediol, trimethylolethane, trimethylolpropane, pentaerythritol, and tris(2-hydroxyethyl) isocyanurate are more preferable.

As the mercaptoalkanoate of the polyols described above, 1,4-butanediol di(2-mercaptopropionate), 1,4-butanediol di(3-mercaptobutanoate), trimethylolethane tri(2-mercaptopropionate), trimethylolethane tri(3-mercaptobutanoate), trimethylolpropane tri(2-mercaptopropionate), trimethylolpropane tri(3-mercaptobutanoate), pentaerythritol tetra(2-mercaptopropionate), pentaerythritol tetra(3-mercaptobutanoate), tris(2-hydroxyethyl) isocyanurate tri(2-mercaptopropionate), and tris(2-hydroxyethyl) isocyanurate tri(3-mercaptobutanoate) are preferable, and 1,4-butanediol di(3-mercaptobutanoate), trimethylolethane tri(3-mercaptobutanoate), trimethylolpropane tri(3-mercaptobutanoate), pentaerythritol tetra(3-mercaptobutanoate), and tris(2-hydroxyethyl) isocyanurate tri(3-mercaptobutanoate) are more preferable.

The amount of the thiol compound (D) used is not particularly limited, within a range not inhibiting the purpose of the present invention. The amount of the thiol compound (D) used is preferably 0.1 parts by mass or more and 20 parts by mass or less, more preferably 0.5 parts by mass or more and 15 parts by mass or less, and further preferably 1 part by mass or more and 12 parts by mass or less per 100 parts by mass in total of the mass of the modified maleimide compound (A) and the mass of the radically polymerizable compound (B).

<Protic Acid (E)>

The curable composition preferably includes the protic acid (E). When the curable composition includes the thiol compound (D) together with the modified maleimide compound (A), a change in viscosity with time may be likely to occur in the curable composition. However, when the curable composition includes the protic acid (E) together with the thiol compound (D), the stability with time of the curable composition can be enhanced. Here, the protic acid refers to a compound capable of releasing a proton H+.

When the modified maleimide compound (A) has an acidic group that acts as a protic acid, such as a carboxy group and a phenolic hydroxyl group, the curable composition including the modified maleimide compound (A) is intended to include the protic acid (E).

The protic acid may be an organic acid or an inorganic acid, but an organic acid is preferable. Specific examples of the organic acid include formic acid, acetic acid, propionic acid, butyric acid, valeric acid, isovaleric acid, acrylic acid, methacrylic acid, oxalic acid, phthalic acid, benzoic acid, salicylic acid, 4-hydroxybenzoic acid, lactic acid, citric acid, tartaric acid, malonic acid, malic acid, succinic acid, glycolic acid, glutamic acid, aspartic acid, maleic acid, caproic acid, caprylic acid, myristic acid, stearic acid, palmitic acid, pyruvic acid, ascorbic acid, adipic acid, phenol, 1-naphthol, 2-naphtholmethanesulfonic acid, benzenesulfonic acid, p-toluenesulfonic acid, methylphosphonic acid, ethylphosphonic acid, and phenylphosphonic acid.

Specific examples of the inorganic acid include hydrochloric acid, hydrobromic acid, sulfuric acid, nitric acid, and phosphoric acid.

The amount of the protic acid (E) used is not particularly limited within a range not inhibiting the purpose of the present invention. The amount of the protic acid (E) used is preferably 0.1 parts by mass or more and 5 parts by mass or less, more preferably 0.2 parts by mass or more and 3 parts by mass or less, and further preferably 0.5 parts by mass or more and 1.5 parts by mass or less per 100 parts by mass in total of the mass of the modified maleimide compound (A) and the mass of the radically polymerizable compound (B).

<Organic Solvent (S)>

The curable composition usually includes the organic solvent (S). The type of the organic solvent (S) is not particularly limited within a range not inhibiting the purpose of the present invention, and may be appropriately selected and used from the organic solvents that are conventionally used in curable compositions.

Specific examples of the organic solvent (S) include ketones such as acetone, methyl ethyl ketone, cyclohexanone, methyl isoamyl ketone, and 2-heptanone; polyhydric alcohols such as ethylene glycol, ethylene glycol monoacetate, diethylene glycol, diethylene glycol monoacetate, propylene glycol, propylene glycol monoacetate, propylene glycol monomethyl ether acetate, dipropylene glycol, dipropylene glycol monoacetate monomethyl ether, monoethyl ether, monopropyl ether, monobutyl ether, and monophenyl ether, and derivatives thereof; cyclic ethers such as dioxane; esters such as ethyl formate, methyl lactate, ethyl lactate, methyl acetate, ethyl acetate, butyl acetate, methyl pyruvate, ethyl pyruvate, methyl acetoacetate, ethyl acetoacetate, ethyl pyruvate, ethyl ethoxyacetate, methyl methoxypropionate, ethyl ethoxypropionate, methyl 2-hydroxypropionate, ethyl 2-hydroxypropionate, ethyl 2-hydroxy-2-methylpropionate, methyl 2-hydroxy-3-methylbutanoate, 3-methoxybutylacetate, and 3-methyl-3-methoxybutylacetate; and aromatic hydrocarbons such as toluene and xylene. These may be used alone or in combination of two or more.

The content of the organic solvent (S) is not particularly limited within a range not inhibiting the purpose of the present invention. The organic solvent (S) is preferably used within a range in which the solid concentration of the curable composition is 30% by mass or more and 70% by mass or less.

[Other Additives]

The curable composition may further contain a maleimide curing agent to improve curing properties, and may further contain a surfactant to improve coating properties, defoaming properties, leveling properties, and the like.

Examples of the maleimide curing agent include diamines, allyl compounds such as low-polarity polyfunctional allylphenol resin (e.g., FATC-809 and FATC-AE (both are manufactured by Gunei Chemical Industry Co., Ltd.)) and allyl ether, 1-propenyl compounds having a 1-propenyl group such as propenylated biphenylene resin (e.g., BPN (manufactured by Gunei Chemical Industry Co., Ltd.)), and benzoxazine compounds.

As the surfactant, for example, a fluorine surfactant or a silicone surfactant is preferably used.

Specific examples of the fluorine surfactant include commercially available fluorine surfactants such as BM-1000 and BM-1100 (both are manufactured by BM Chemie), Megaface F142D, Megaface F172, Megaface F173, and Megaface F183 (all of which are manufactured by DIC Corporation), Fluorad FC-135, Fluorad FC-170C, Fluorad FC-430, and Fluorad FC-431 (all of which are manufactured by Sumitomo 3M Limited), Surflon S-112, Surflon S-113, Surflon S-131, Surflon S-141, and Surflon S-145 (all of which are manufactured by Asahi Glass Co., Ltd), and SH-28PA, SH-190, SH-193, SZ-6032, and SF-8428 (all of which are manufactured by Toray Silicone Co., Ltd.), but are not limited thereto.

As the silicone surfactant, an unmodified silicone surfactant, a polyether-modified silicone surfactant, a polyester-modified silicone surfactant, an alkyl-modified silicone surfactant, an aralkyl-modified silicone surfactant, a reactive silicone surfactant, and the like are preferably used.

As the silicone surfactant, a commercially available silicone surfactant may be used. Specific examples of the commercially available silicone surfactant include Paintad M (manufactured by Dow Corning Toray Co., Ltd.), TOPICA K1000, TOPICA K2000, and TOPICA K5000 (all of which are manufactured by TAKACHIHO SANGYO CO., LTD.), XL-121 (a polyether-modified silicone surfactant, manufactured by Clariant), and BYK-310 (a polyester-modified silicone surfactant, manufactured by BYK Chemie).

The curable composition may contain an antioxidant. As the antioxidant, a conventionally known antioxidant may be used without particular limitation. Examples thereof include hindered phenol antioxidants (e.g., Irganox 1010 (manufactured by BASF)), hindered amine antioxidants, phosphorus antioxidants, and sulfur antioxidants.

The curable composition may contain a polymerization inhibitor to appropriately prevent polymerization during a reaction. As the polymerization inhibitor, a conventionally known polymerization inhibitor may be used without particular limitation, and examples thereof include methoquinone, hydroquinone, methylhydroquinone, p-methoxyphenol, pyrogallol, tert-butylcatechol, and phenothiazine.

When an insulating film is formed using a curable composition, the curable composition may contain an adhesion improving agent to improve the adhesion between metal wiring or a substrate for electrical and electronic devices having metal wiring and the insulating film to be formed by using the curable composition. As the adhesion improving agent, a conventionally known adhesion improving agent may be used without particular limitation, and examples thereof include benzotriazole.

[Preparation Method of Curable Composition]

The curable composition is prepared by mixing and stirring the above components by an ordinary method. Examples of the apparatus that can be used when the above components are mixed and stirred include a dissolver, a homogenizer, and a three-roll mill. After the above components are uniformly mixed, the obtained mixture may further be filtered using a mesh, a membrane filter, or the like.

The curable composition is preferably a multi-agent mixed curable composition consisting of two or more agents including a first agent including the modified maleimide compound (A) and a second agent including the thiol compound (D). When the modified maleimide compound (A) and the thiol compound (D) coexists in the curable composition, a change with time may be likely to occur in the curable composition. However, such a problem of change with time does not occur in the above multi-agent mixed curable composition.

For example, the above multi-agent mixed curable composition may be a multi-agent mixed composition having three or more agents that further includes a third agent including the radical generator (C). However, the multi-agent mixed curable composition is preferably a two-agent mixed curable composition that consists of the first agent including the modified maleimide compound (A) and the second agent including the thiol compound (D), from the viewpoint of easy mixing operation upon use.

With respect to such a two-agent mixed curable composition, each of the first agent including the modified maleimide compound (A) and the second agent including the thiol compound (D) may optionally include one or more components other than the modified maleimide compound (A) and the thiol compound (D). In the two-agent mixed curable composition, either the first agent or the second agent includes the radical generator (C).

<Method for Forming Insulating Film>

An insulating film is formed by using the above curable composition.

The method for forming an insulating film includes:

a coating step of coating a site where an insulating film is to be formed with the curable composition to form a coating film; and a curing step of curing the coating film.

Preferably, an insulating film that insulates metal wiring in electrical and electronic devices having metal wiring can be formed by using the curable composition.

In the method for forming an insulating film, for example, at least a site where an insulating film is to be formed on the substrate for electrical and electronic devices having metal wiring is coated with the curable composition to form a coating film.

As the coating method of the curable composition, methods such as spin coating, slit coating, roll coating, screen printing, ink jetting, and applicator may be employed. When a printing method such as screen printing and ink jetting is applied, only a site where an insulating film is to be formed can be coated with the curable composition.

The thickness of the coating film is not particularly limited, but is preferably 0.5 μm or more, more preferably 0.5 μm or more and 300 μm or less, particularly preferably 1 μm or more and 150 μm or less, and most preferably 3 μm or more and 50 μm or less.

Then, if necessary, the coating film is subjected to drying or prebaking. The prebaking conditions vary depending on the type of components, blending ratio, coating film thicknesses, and the like in the curable composition, but are typically 70° C. or more and 200° C. or less, preferably 80° C. or more and 150° C. or less, and about 2 minutes or more and 120 minutes or less.

When the curable composition includes the photoradical generator (C1), the coating film is irradiated with (exposed to) active light or radiation, for example, with ultraviolet rays or visible light having a wavelength of 300 nm or more and 500 nm or less. Exposure may be carried out to the entire surface of the coating film, or position-selective exposure (pattern exposure) may be carried out by a method of, for example, exposing active light or radiation via a mask having a predetermined pattern.

The modified maleimide compound (A) and the radically polymerizable compound (B) which are polymerization components are polymerized by exposure, so that an insulating film is formed. As a result, an insulating film is formed, for example, on a substrate for electrical and electronic devices having metal wiring.

As the light source of the radiation, a low pressure mercury lamp, a high pressure mercury lamp, an extra-high pressure mercury lamp, a metal halide lamp, an argon gas laser, or the like may be used. The radiation includes microwaves, infrared rays, visible light, ultraviolet rays, X-rays, γ-rays, electron beams, proton beams, neutron beams, ion beams, and the like. The amount of radiation irradiated varies depending on the composition of the curable composition, the film thickness of the coating film, and the like, but is, for example, 100 mJ/cm$^2$ or more and 10,000 mJ/cm$^2$ or less when an extra-high pressure mercury lamp is used. To generate radicals, a light that activates the radical generator (C) may be included in the radiation.

In the case of position-selective exposure, the coating film exposed is developed according to a conventionally known method, an unnecessary portion is dissolved and removed, thereby forming an insulating film having a predetermined shape. At this time, the organic solvent (S) and the alkaline aqueous solution described above may be used as a developing solution. For example, when the aforementioned modified maleimide compound (A) has an alkali-soluble group such as a carboxy group and a phenolic hydroxyl group, development by an alkaline aqueous solution is possible.

As the alkaline aqueous solution used as the developing solution, for example, an aqueous solution of an alkali such as sodium hydroxide, potassium hydrate, sodium carbonate, sodium silicate, sodium metasilicate, aqueous ammonia, ethylamine, n-propylamine, diethylamine, di-n-propylamine, triethylamine, methyldiethylamine, dimethylethanolamine, triethanolamine, tetramethylammonium hydroxide (tetramethyl ammonium hydroxide), tetraethylammonium hydroxide, pyrrole, piperidine, 1,8-diazabicyclo[5,4,0]-7-undecene, and 1,5-diazabicyclo[4,3,0]-5-nonane may be used. In addition, an aqueous solution obtained by adding an appropriate amount of a water-soluble organic solvent such as methanol and ethanol or a surfactant to the above aqueous solution of an alkali may also be used as the developing solution.

The development time varies depending on the composition of the curable composition, the film thickness of the coating film, and the like, but is usually 1 minute or more and 30 minutes or less. The development method may be any of a liquid-filling method, a dipping method, a puddle method, a spray development method, and the like.

After development, for example, washing with running water is carried out for 30 seconds or more and 90 seconds or less, and drying is carried out using an air gun, an oven, or the like.

In this way, for example, an insulating film patterned into a desired shape is formed on the substrate for electrical and electronic devices having metal wiring.

Hereinbefore, an example of forming an insulating film through polymerization of the modified maleimide compound (A) and the radically polymerizable compound (B) which are polymerization components by exposure has been described. When the curable composition includes the thermal radical generator (C2), the modified maleimide compound (A) and the radically polymerizable compound (B) which are polymerization components may be polymerized by heating to form an insulating film.

The insulating film formed has a low dielectric constant and a low dielectric loss tangent, and is thus suitable as the insulating film of electrical and electronic devices having metal wiring for high frequency applications. For example, the insulating film formed may be used as the insulating film of electrical and electronic devices having metal wiring for frequencies of 3 GHz or more and 30 GHz or less for a 5G communication band candidate or for millimeter wave band frequencies of 30 GHz or more and 300 GHz or less. In addition, the insulating film formed has excellent heat resistance, and is thus suitable for the application in which an insulating film is formed and then heated, and further, a member such as wiring is formed.

EXAMPLES

Hereinafter, the present invention will be described further in detail by way of Examples, but the present invention is not limited to these Examples.

Preparation Example 1

As the unmodified polyphenylene ether resin, a polyphenylene ether resin having a phenolic hydroxyl group terminal of the following structure (SA90, manufactured by SABIC Innovative Plastics) was used.

[Chem. 10]

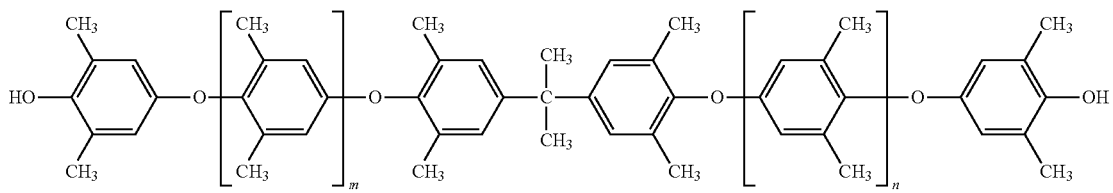

To 1,184 parts by mass of dichloroethane, 166 parts by mass of the unmodified polyphenylene ether resin and 47.2 parts by mass of a carboxylic acid having a maleimide group of the following structure were added.

[Chem. 11]

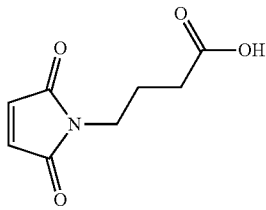

Into the reaction liquid, 40.9 parts by mass of diisopropylcarbodiimide and 0.25 parts by mass of dimethylaminopyridine were added, and then, a modification reaction of the terminal phenolic hydroxyl group was carried out at 5° C. for 8 hours. After the reaction, the reaction liquid was filtered and reprecipitated with acetonitrile to obtain 145 parts by mass of a maleimide modified polyphenylene ether resin A1 in which the phenolic hydroxyl groups at both terminals of the unmodified polyphenylene ether resin were modified with a group of the following formula. The mass average molecular weight (Mw) in terms of polystyrene of the maleimide modified polyphenylene ether resin A1 measured by gel permeation chromatography (GPC) was 7,000.

[Chem. 12]

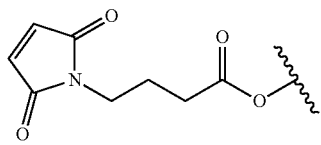

Preparation Example 2

As resin A2, a resin in which an amino group in a copolymer of styrene and 4-aminostyrene was modified with maleimide was prepared.

72.8 parts by mass of a copolymer in which a copolymerization ratio of styrene to 4-aminostyrene is such that styrene/4-aminostyrene (mole bases) is 80/20 (mole basis), and 41 parts by mass of oxonorbornene acid anhydride represented by the following formula were dissolved in 300 parts by mass of tetrahydrofuran, and the mixture was stirred under nitrogen atmosphere for 4 hours.

[Chem. 13]

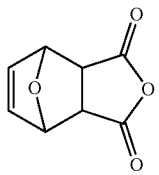

Then, into the reaction liquid, 61 parts by mass of carbonyldiimidazole were added, and then the reaction liquid was stirred for 6 hours. Thereafter, the reaction liquid was added dropwise to 1,500 parts by mass of heptane, thereby collecting a precipitated polymer of the following structure. In the following structural formula, the number shown at the bottom right in the parenthesis in each of the constitutional units represents the content of a constitutional unit in each resin (mol %).

[Chem. 14]

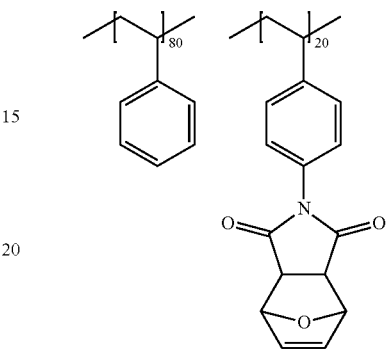

The obtained polymer of the above structure was used as a 20% by mass toluene solution, which was stirred under reflux for 4 hours. Thereafter, the obtained product was reprecipitated with heptane to obtain 17.8 parts by mass of a solid resin A2 of the following structure.

The maleimide structure was identified by the carbonyl peak and the peak of a double bond in $^{13}C$ NMR. The measuring solvent of $^{13}C$ NMR was acetone-d6. The mass average molecular weight (Mw) of the obtained resin A2 was determined by gel permeation chromatography (GPC) in terms of polystyrene.

The mass average molecular weight (Mw) of the resin A2 was 15,000.

[Chem. 15]

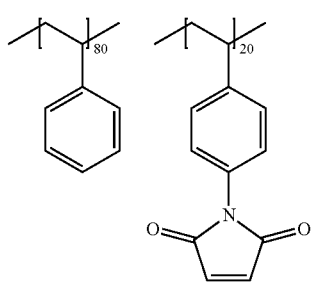

<Preparation of Curable Composition>

Examples 1 to 14 and Comparative Examples 1 to 4

In Examples 1 to 14, the above resin A1, A2, and the following A3 were used as the modified maleimide compound (A). A3 was BMI-689 (manufactured by Designer molecules Inc.).

[Chem. 16]

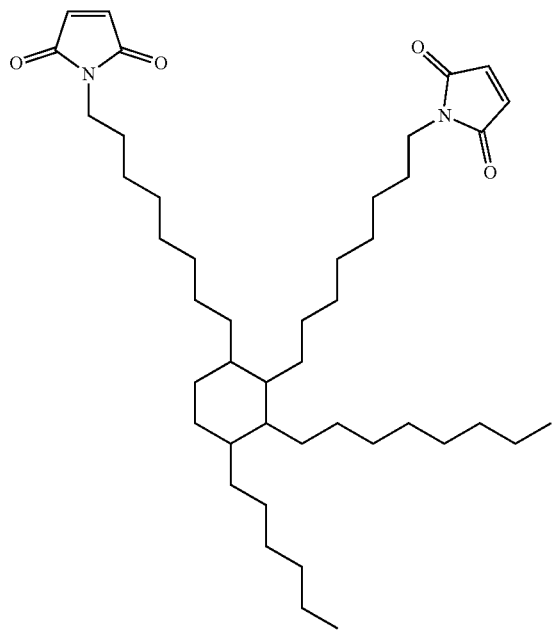

A3

In Examples 1 to 14 and Comparative Examples 1 to 4, the following C1 and C2 were used as the radical generator (C).
C1: Irgacure OXE02 (manufactured by BASF)
C2: perhexyl D (manufactured by NOF CORPORATION)
In Examples 1 to 14, the following D1 and D2 were used as the thiol compound (D).
D1: pentaerythritol tetra(3-mercaptobutanoate)
D2: tris(2-hydroxyethyl) isocyanurate tri(3-mercaptobutanoate)
In Examples 1 to 8 and Examples 11 to 14, the following E1 to E3 were used as the protic acid (E).
E1: phenylphosphonic acid
E2: salicylic acid
E3: malonic acid
In Examples 1 to 14 and Comparative Examples 1 to 4, the following F1 to F3 were used as the additive.
F1: Irganox 1010 (manufactured by BASF)
F2: FATC-809 (maleimide curing agent, low-polarity polyfunctional allylphenol resin (manufactured by Gunei Chemical Industry Co., Ltd.))
F3: FATC-AE (maleimide curing agent, low-polarity polyfunctional allylphenol resin (manufactured by Gunei Chemical Industry Co., Ltd.))

The modified maleimide compound (A), the radical generator (C), the thiol compound (D), the protic acid (E), and the additive, the kinds and amounts of which are described in Tables 1 to 2, and 0.05 parts by mass of a surfactant (BYK310, manufactured by BYK Chemie) were dissolved in propylene glycol monomethyl etheracetate (PGMEA) such that the solid concentration was 40% by mass, whereby the curable compositions of Examples and Comparative Examples were obtained.
<Evaluation>
By using the obtained curable compositions, film formation properties, photolithographic properties, dielectric constant, dielectric loss tangent, and heat resistance were evaluated according to the following methods. These evaluation results are shown in Table 1 to 2.
[Film Formation Properties and Photolithographic Properties]
A Si substrate having a diameter of 200 mm was coated with each of the curable compositions of Examples and Comparative Examples to form a coating film. Then, the coating film was prebaked (PAB) at 80° C. for 200 seconds. Note that the film thickness of the coating film after prebaking was 11 μm. After prebaking, pattern exposure with a ghi line was carried out at an exposure amount of 100 mJ/cm$^2$ or more and 4,400 mJ/cm$^2$ or less using a mask with a hole pattern capable of forming a circular opening having a diameter of 30 μm and an exposure apparatus Prisma GHI5452 (manufactured by Ultratech, Inc.). Note that the focus was 0 μm (coating film surface).

Then, the substrate was placed on a hot plate and subjected to post exposure baking (PEB) at 90° C. for 1.5 minutes. Thereafter, the exposed coating film was immersed in propylene glycol monomethyl ether acetate (PGMEA) at 60° C. for 60 seconds. Thereafter, the obtained product was blown with nitrogen and heated under nitrogen atmosphere at 180° C. for 1 hour to obtain a pattern (insulating film).

The surface of the coating film before prebaking was observed with a scanning electron microscope and the film formation properties was evaluated. Specifically, a case where no crack and/or no crystal was observed on the pattern surface, and no tackiness (stickiness) was present on the pattern, and the contained components were compatible and transparent was evaluated as good (indicated by circle symbol (○)). A case where a crack was observed on the pattern surface was evaluated as a, a case where crystal was observed on the pattern surface was evaluated as b, a case where tackiness (stickiness) was present on the pattern surface was evaluated as c, a case where the contained components were not compatible and opaque was evaluated as d, and the film formation properties were evaluated as poor (indicated by cross symbol (x)) in the case of corresponding to at least one of a to d.

Also, the surface and cross-section surface of the obtained pattern (insulating film) were observed with a scanning electron microscope and the photolithographic properties were evaluated. Specifically, in the aforementioned range of the exposure amount, a case where conditions for forming an opening having a diameter of 30 μm were present was evaluated as good (indicated by circle symbol (○)), and when conditions for forming an opening having a diameter of 30 μm were not present was evaluated as poor (indicated by cross symbol (x)).
[Dielectric Constant and Dielectric Loss Tangent]
A Si substrate having a diameter of 200 mm was coated with each of the curable compositions of Examples and Comparative Examples to form a coating film. Then, the coating film was prebaked (PAB) at 80° C. for 200 seconds. Note that the film thickness of the coating film after prebaking was 11 μm. After prebaking, the entire surface was exposed with a ghi line at an exposure amount of 4,400 mJ/cm$^2$ using an exposure apparatus Prisma GHI5452 (manufactured by Ultratech, Inc.). Note that the focus was 0 μm (coating film surface). Note that the focus was 0 μm (coating film surface). Thereafter, the coating film surface was blown with nitrogen and heated under nitrogen atmosphere at 180° C. for 1 hour to obtain a sample.

The dielectric constant (E) and the dielectric loss tangent (tan δ) of the obtained sample were measured by a method described in Technical Report of the Institute of Electronics, Information, and Communication Engineers vol. 118, no.

506, MW2018-158, pp. 13-18, March 2019, "A study on millimeter wave complex permittivity evaluations by the circular empty cavity method for photosensitive insulator" (Kouhei Takahagi (Utsunomiya University), Kazuaki Ebisawa (TOKYO OHKA KOGYO CO., LTD.), Yoshinori Kogami (Utsunomiya University), Takashi Shimizu (Utsunomiya University)). Measurement was made by using a network analyzer HP8510C (manufactured by Keysight Technologies) by a cavity resonator method under conditions of room temperature of 25° C., humidity of 50%, frequency of 36 GHz, and sample thickness of 10 μm. The dielectric constant was evaluated by determining a case where the dielectric constant value was less than 3.00 as good (indicated by circle symbol (○)) and a case where the dielectric constant value was 3.00 or more as poor (indicated by cross symbol (x)).

The dielectric loss tangent was evaluated by determining a case where the dielectric loss tangent value was less than 0.01 as good (indicated by circle symbol (○)) and a case where the dielectric loss tangent value was 0.01 or more as poor (indicated by cross symbol (x)).

[Heat Resistance]

With respect to the sample obtained in the same manner as in the item [Dielectric Constant and Dielectric Loss Tangent], a peak top temperature (° C.) of tan δ measured using a dynamic viscoelasticity measurement apparatus Rheogel-E4000 (manufactured by Universal Building Materials Co., Ltd.) was made to be the glass transition temperature (Tg) (DMA method). The measurement conditions were as follows: measurement mode: tension mode, frequency: 10 Hz, temperature rising rate: 5° C./min, measurement temperature range: 40 to 300° C., sample shape: 50 mm in length, 5 mm in width, and 10 μmm in thickness.

Heat resistance was evaluated by determining a case where Tg was 150° C. or more as good (indicated by circle symbol (○)), and a case where Tg was less than 150° C. as poor (indicated by cross symbol (x)).

[Elongation and Tensile Strength]

A film was stripped from each Si substrate, and a strip-shaped specimen having a width of 1 cm and a length of 5 cm was cut out from the obtained film. Tensile test was carried out by using the obtained specimen and an EZ-test (manufactured by SHIMADZU CORPORATION) with a chuck-to-chuck distance of 2 cm and a tensile speed of 1 mm/min, whereby elongation and tensile strength were measured. The chuck-to-chuck distance at the breaking point was determined as the elongation.

The elongation when the elongation measured by the above method was 8% or more was evaluated as good (indicated by circle symbol (○)), and the elongation when it was less than 8% was evaluated as poor (indicated by cross symbol (x)).

The tensile strength when the tensile strength measured by the above method was 90 MPa or more was evaluated as good (indicated by circle symbol (○)), and the tensile strength when it was less than 90 MPa was evaluated as poor (indicated by cross symbol (x)).

[Storage Stability]

The curable compositions of Examples were stored at room temperature for 1 week, and a case where no gelation occurred was evaluated as good (indicated by circle symbol (○)), and a case where gelation occurred was evaluated as poor (indicated by cross symbol (x)).

TABLE 1

| | Modified maleimide compound (A) Type/part by mass | Radical generator (C) Type/part by mass | Thiol compound (D) Type/part by mass | Protic acid (E) Type/part by mass | Additive Type/part by mass |
|---|---|---|---|---|---|
| Example 1 | A1/60 A3/40 | C1/5 C2/1 | D1/4 | E1/1 | F1/0.1 |
| Example 2 | A2/60 A3/40 | | | | |
| Example 3 | A1/60 A3/40 | | D2/6 | | |
| Example 4 | A2/60 A3/40 | | | | |
| Example 5 | A2/40 A3/60 | | D1/10 | | |
| Example 6 | A1/80 A3/20 | | D1/4 | | |
| Example 7 | A1/60 A3/40 | | | E2/1 | |
| Example 8 | | | | E3/1 | |
| Example 9 | | | | — | |
| Example 10 | | | | — | |
| Example 11 | | | | E1/1 | F1/0.1 F2/20 |
| Example 12 | | | | | F1/0.1 F2/30 |
| Example 13 | | | | | F1/0.1 F3/20 |
| Example 14 | | | | | F1/0.1 F3/30 |

TABLE 2

| | Modified maleimide compound (A) Type/part by mass | Radical generator (C) Type/part by mass | Thiol compound (D) Type/part by mass | Protic acid (E) Type/part by mass | Additive Type/part by mass |
|---|---|---|---|---|---|
| Comparative Example 1 | A1/60 A3/40 | C1/5 C2/1 | — | — | F1/0.1 |
| Comparative Example 2 | A2/60 A3/40 | | | | |
| Comparative Example 3 | A2/40 A3/60 | | | | |
| Comparative Example 4 | A1/80 A3/20 | | | | |

TABLE 3

| | Film formation properties | Photolithographic properties | Dielectric constant | Dielectric loss tangent | Heat resistance | Elongation | Tensile strength | Storage stability |
|---|---|---|---|---|---|---|---|---|
| Example 1 | ○ | ○ | ○ | ○ | ○ | ○ | ○ | ○ |
| Example 2 | ○ | ○ | ○ | ○ | ○ | ○ | ○ | ○ |
| Example 3 | ○ | ○ | ○ | ○ | ○ | ○ | ○ | ○ |
| Example 4 | ○ | ○ | ○ | ○ | ○ | ○ | ○ | ○ |

TABLE 3-continued

|  | Film formation properties | Photolithographic properties | Dielectric constant | Dielectric loss tangent | Heat resistance | Elongation | Tensile strength | Storage stability |
|---|---|---|---|---|---|---|---|---|
| Example 5 | ○ | ○ | ○ | ○ | ○ | ○ | ○ | ○ |
| Example 6 | ○ | ○ | ○ | ○ | ○ | ○ | ○ | ○ |
| Example 7 | ○ | ○ | ○ | ○ | ○ | ○ | ○ | ○ |
| Example 8 | ○ | ○ | ○ | ○ | ○ | ○ | ○ | ○ |
| Example 9 | ○ | ○ | ○ | ○ | ○ | ○ | ○ | × |
| Example 10 | ○ | ○ | ○ | ○ | ○ | ○ | ○ | × |
| Example 11 | ○ | ○ | ○ | ○ | ○ | ○ | ○ | ○ |
| Example 12 | ○ | ○ | ○ | ○ | ○ | ○ | ○ | ○ |
| Example 13 | ○ | ○ | ○ | ○ | ○ | ○ | ○ | ○ |
| Example 14 | ○ | ○ | ○ | ○ | ○ | ○ | ○ | ○ |

TABLE 4

|  | Film formation properties | Photolithographic properties | Dielectric constant | Dielectric loss tangent | Heat resistance | Elongation | Tensile strength | Storage stability |
|---|---|---|---|---|---|---|---|---|
| Comparative Example 1 | ○ | ○ | ○ | ○ | ○ | × | × | ○ |
| Comparative Example 2 | ○ | ○ | ○ | ○ | ○ | × | × | ○ |
| Comparative Example 3 | ○ | ○ | ○ | ○ | ○ | ○ | × | ○ |
| Comparative Example 4 | ○ | ○ | ○ | ○ | ○ | × | ○ | ○ |

According to Examples 1 to 14, it is found that the curable composition including the modified maleimide compound (A), the radical generator (C), and the thiol compound (D) has excellent film formation properties and photolithographic properties, and thus can form a cured film that may be suitably used as an insulating film and has excellent dielectric characteristics, heat resistance, elongation, and tensile strength.

On the other hand, according to Comparative Examples 1 to 4, it is found, when the curable composition includes the modified maleimide compound (A), but includes no thiol compound (D), both excellent elongation and excellent tensile strength cannot be achieved for the cured film.

In addition, it is found from the comparison between Examples 9 and 10 and other Examples, when the curable composition includes the thiol compound (D) together with the modified maleimide compound (A), gelation with time is likely to occur but gelation with time is prevented by adding the protic acid (E) to the curable composition.

The invention claimed is:

1. A curable composition comprising a modified maleimide compound (A), a radical generator (C), a thiol compound (D), and a protic acid (E), wherein
the modified maleimide compound (A) has one or more groups represented by the following formula (a1):

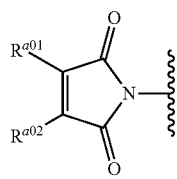

(a1)

and,
the group represented by the formula (a1) is bonded to a carbon atom in an aliphatic hydrocarbon group or an aromatic group in the modified maleimide compound (A), wherein $R^{a01}$ and $R^{a02}$ are each independently a hydrogen atom, an alkyl group having 1 or more and 6 or less carbon atoms, a cycloalkyl group having 3 or more and 8 or less carbon atoms, or an aryl group having 6 or more and 12 or less carbon atoms, and wherein the protic acid (E) is selected from the group consisting of formic acid, propionic acid, butyric acid, valeric acid, isovaleric acid, oxalic acid, phthalic acid, benzoic acid, salicylic acid, 4-hydroxybenzoic acid, lactic acid, citric acid, tartaric acid, malonic acid, malic acid, succinic acid, glycolic acid, glutamic acid, aspartic acid, maleic acid, caproic acid, caprylic acid, myristic acid, stearic acid, palmitic acid, pyruvic acid, ascorbic acid, adipic acid, phenol, 1-naphthol, 2-naphtholmethanesulfonic acid, methylphosphonic acid, ethylphosphonic acid, and phenylphosphonic acid.

2. The curable composition according to claim 1, wherein the radical generator (C) comprises a photoradical generator (C1), and the curable composition is capable of being cured by exposure.

3. The curable composition according to claim 1, wherein the modified maleimide compound (A) is a maleimide modified polyphenylene ether resin (A1-1).

4. The curable composition according to claim 1, wherein the thiol compound (D) is a mercaptoalkanoate of a polyol having two or more hydroxyl groups.

5. The curable composition according to claim 4, wherein the thiol compound (D) is 3-mercaptobutanoate of the polyol.

6. The curable composition according to claim 1, wherein the curable composition is a multi-agent mixed curable composition consisting of two or more agents comprising a first agent comprising the modified maleimide compound (A) and a second agent comprising the thiol compound (D).

7. The curable composition according to claim 1, wherein the curable composition is used to form an insulating film.

8. A cured product of the curable composition according to claim 1.

9. A method for forming an insulating film comprising: coating the curable composition according to claim 1 on an insulating film formation place to form a coating film; and curing the coating film.

10. The method for forming an insulating film according to claim 9, wherein the curable composition comprises a photoradical generator (C1) as a radical generator (C), and the coating film is cured by exposure.

11. The method for forming an insulating film according to claim 10, wherein the exposure to the coating film is position-selectively carried out, and the method further comprises developing the exposed coating film with a developing solution.

* * * * *